(12) United States Patent
Sang et al.

(10) Patent No.: US 10,951,285 B2
(45) Date of Patent: Mar. 16, 2021

(54) HYBRID MOBILITY AND RADIO RESOURCE MANAGEMENT MECHANISMS

(71) Applicant: Futurewei Technologies, Inc., Plano, TX (US)

(72) Inventors: Aimin Justin Sang, San Diego, CA (US); Bin Liu, San Diego, CA (US); Hongcheng Zhuang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/587,309

(22) Filed: May 4, 2017

(65) Prior Publication Data

US 2018/0199328 A1    Jul. 12, 2018

Related U.S. Application Data

(60) Provisional application No. 62/443,586, filed on Jan. 6, 2017.

(51) Int. Cl.
*H04W 4/00* (2018.01)
*H04B 7/06* (2006.01)
(Continued)

(52) U.S. Cl.
CPC ........... *H04B 7/0617* (2013.01); *H04B 7/022* (2013.01); *H04B 7/0695* (2013.01); *H04L 5/001* (2013.01);
(Continued)

(58) Field of Classification Search
None
See application file for complete search history.

(56) References Cited

U.S. PATENT DOCUMENTS 9,144,075 B2 *  9/2015  Rubin ................. H04W 72/046
9,219,541 B2 * 12/2015  Rubin ....................... H04B 7/26
(Continued)

FOREIGN PATENT DOCUMENTS

CN    102204329 A    9/2011
CN    103503359 A    1/2014
(Continued)

OTHER PUBLICATIONS

U.S. Appl. No. 62/417,247. "Beam Sets for Cell and Beam Mobility". Nagaraja et al. (filed 2016).*
(Continued)

*Primary Examiner* — Kwang B Yao
*Assistant Examiner* — Juvena W Loo
(74) *Attorney, Agent, or Firm* — Schwegman Lundberg & Woessner, P.A.

(57) ABSTRACT

A communication device includes a level one (L1) processing element configured to measure downlink (DL) reference signals from multiple beams received via a transceiver to generate L1 data describing the multiple beams. The device also includes a level two (L2) processing element configured to consolidate, select, or filter the multiple beams responsive to the L1 data to produce L2 data corresponding to one or more of the multiple beams in a first cell that are consistent with preconfigured parameters. Furthermore, the device includes a level three (L3) processing element coupled to the L1 and L2 processing elements and configured to generate L3 data corresponding to one or more of the multiple beams in each of the first cell and a second cell. The device also includes a report generator coupled to the L1, L2 and L3 processing elements and configured to generate a report for a mobility event.

29 Claims, 11 Drawing Sheets

(51) Int. Cl.
*H04L 5/00* (2006.01)
*H04B 7/022* (2017.01)
*H04L 29/08* (2006.01)

(52) U.S. Cl.
CPC .......... *H04L 5/0048* (2013.01); *H04L 69/323* (2013.01); *H04L 69/324* (2013.01)

(56) References Cited

U.S. PATENT DOCUMENTS

| | | | | |
|---|---|---|---|---|
| 9,729,219 | B2* | 8/2017 | Chapman | H04B 7/0617 |
| 2011/0237259 | A1 | 9/2011 | Dimou et al. | |
| 2012/0014425 | A1 | 1/2012 | Zhuang et al. | |
| 2013/0051364 | A1 | 2/2013 | Seol et al. | |
| 2014/0050089 | A1* | 2/2014 | Zhang | H04W 28/08 370/232 |
| 2014/0146788 | A1* | 5/2014 | Wallentin | H04W 36/32 370/331 |
| 2014/0185465 | A1 | 7/2014 | Balachandran et al. | |
| 2015/0181453 | A1 | 6/2015 | Chen et al. | |
| 2015/0230263 | A1* | 8/2015 | Roy | H04W 16/28 455/452.2 |
| 2016/0007261 | A1 | 1/2016 | Oh et al. | |
| 2016/0044551 | A1* | 2/2016 | Frenger | H04B 7/0617 370/252 |
| 2016/0219570 | A1* | 7/2016 | Guo | H04L 5/0048 |
| 2016/0285660 | A1 | 9/2016 | Frenne et al. | |
| 2016/0330643 | A1* | 11/2016 | Sahin | H04W 16/14 |
| 2017/0149480 | A1* | 5/2017 | Kakishima | H04J 11/00 |
| 2017/0208494 | A1* | 7/2017 | Moon | H04L 5/0048 |
| 2017/0230869 | A1* | 8/2017 | Kubota | H04L 5/0048 |
| 2017/0231010 | A1* | 8/2017 | Jung | H04W 74/0833 |
| 2017/0251518 | A1* | 8/2017 | Agiwal | H04W 24/08 |
| 2017/0324459 | A1* | 11/2017 | Koskela | H04W 24/08 |
| 2017/0331577 | A1* | 11/2017 | Parkvall | H04J 11/0079 |
| 2018/0006770 | A1* | 1/2018 | Guo | H04L 1/1835 |
| 2018/0048442 | A1 | 2/2018 | Sang et al. | |
| 2018/0091968 | A1* | 3/2018 | Ly | H04L 43/16 |
| 2018/0092094 | A1* | 3/2018 | Ly | H04L 5/0055 |
| 2018/0092156 | A1* | 3/2018 | Kim | H04W 72/0406 |
| 2018/0102826 | A1* | 4/2018 | Raghavan | H04B 7/0617 |
| 2018/0124766 | A1* | 5/2018 | Nagaraja | H04L 5/0048 |
| 2018/0132158 | A1* | 5/2018 | Tseng | H04W 76/27 |
| 2018/0184387 | A1* | 6/2018 | Axen | H04W 36/0083 |
| 2018/0213455 | A1* | 7/2018 | Ryden | H04W 56/0015 |
| 2018/0279151 | A1* | 9/2018 | Tseng | H04W 36/0058 |
| 2018/0288753 | A1* | 10/2018 | Kishiyama | H04W 16/28 |
| 2019/0014517 | A1* | 1/2019 | Xie | H04B 17/318 |
| 2019/0268782 | A1* | 8/2019 | Martin | H04W 72/046 |
| 2019/0280790 | A1* | 9/2019 | Li | H04B 7/0695 |
| 2020/0037285 | A1* | 1/2020 | Sivavakeesar | H04W 68/005 |

FOREIGN PATENT DOCUMENTS

| | | |
|---|---|---|
| CN | 105027649 A | 11/2015 |
| CN | 105075309 A | 11/2015 |
| CN | 105451251 A | 3/2016 |
| EP | 2161851 A1 | 3/2010 |
| EP | 2979479 B1 | 2/2020 |
| WO | 2008041166 A1 | 4/2008 |
| WO | WO-2018088538 A1 | 5/2018 |

OTHER PUBLICATIONS

U.S. Appl. No. 62/402,897, "Methods Assisting in Beam Sweep, Tracking and Recovery", Raghavan et al. (filed 2016).*

U.S. Appl. No. 62/374,045, Tseng, "Mobility Procedure in Millimeter Wave Communication Systenns",filed Aug. 12, 2016 (Year: 2016).*

"International Application Serial No. PCT CN2017/116677, International Search Report dated Feb. 11, 2018", 5 pgs.

"International Application Serial No. PCT CN2017/116677, Written Opinion dated Feb. 11, 2018", 4 pgs.

Sang, Amin, J., "System and Method for User Equipment Beaconing and Beam Alignment", U.S. Appl. No. 62/374,668, filed Aug. 12, 2016, 51 pgs.

"Consolidation of Multiple Beams for DL Measurements", R2-168000 MediaTek Inc., 3GPP TSG-RAiV WG2 Meeting #96, Reno, USA, Nov. 14-18, 2016, (Nov. 14, 2016), 5 pgs.

"European Application No. 17890399.3, Extended European Search Report dated Oct. 29, 2019", (Oct. 29, 2019), 15 pgs.

"Inter-cell and intra-cell mobility in multi-TRP deployments", R2-168719 Ericsson, 3GPP TSG-RAN WG2 #96, Reno, Nevada, USA, Nov. 14?18 2016, (Nov. 14, 2016), 4 pgs.

"Measurement and Mobility in high frequency", R2-168255 Huawei et al., 3GPP TSG-RAN2 Meeting #96, Reno, Nevada, USA, Nov. 14-18, 2016, (Nov. 14, 2016), 4 pgs.

"Mobility Measurements in Connected Mode", R2-1700112 Nokia et al., 3GPP TSG-RAN WG2 NR Adhoc, Spokane, USA, Jan. 17-19, 2017, (Jan. 17, 2017), 6 pgs.

"Uplink based mobility physical channels", R1-166387 Qualcomm Incorporated, 3GPP TSG-RAN WG1 #86, Gothenburg, Sweden, Aug. 22?26, 2016, (Aug. 22, 2016), 5 pgs.

"Chinese Application No. 201780082602.8, First Office Action dated May 25, 2020", (May 25, 2020), 24 pgs.

"Japanese Application No. 2019-536966, Notice of reasons for Rejection dated Oct. 26, 2020", (Oct. 26, 2020), 13 pgs.

* cited by examiner

HYBRID MOBILITY AND RADIO RESOURCE MANAGEMENT MECHANISMS

RELATED APPLICATION

This application claims priority to U.S. Provisional Application Ser. No. 62/443,586 (entitled "HYBRID MOBILITY MECHANISMS," and filed on Jan. 6, 2017) the disclosure of which is hereby incorporated by reference in its entirety.

TECHNICAL FIELD

The present disclosure is related to mobility mechanisms, and in particular to hybrid mobility and radio resource management (RRM) mechanisms for beamforming cellular and other beamforming wireless systems.

BACKGROUND

Radio resource management (RRM) and mobility mechanisms are tightly associated with each other. Mobility and RRM are the systems for radio level control and measurement of radio channels and co-channel interference and other radio transmission characteristics in wireless communication systems, for example cellular networks, wireless networks and broadcasting systems. RRM involves strategies and algorithms for measuring and controlling parameters such as transmit power, user resource allocation, beamforming, data rates, handover related criteria, modulation scheme, error coding scheme, etc. The objective is to utilize the limited radio-frequency spectrum resources and radio network infrastructure as efficiently as possible. The radio resource management (RRM) model for long term evolution (LTE) is well established for omnidirectional cellular systems. These systems use network layer messaging, for example, radio resource control (RRC) messaging at Open Systems Interconnection (OSI) Layer 3 or L3.

Generally speaking, RRM involves end-to-end operations over the air at both a user equipment (UE) device and/or at a network node (e.g., an evolved Node B or eNB) as well as interactions among UE devices and network nodes operating in a service area. RRM exists at multiple layers, ranging from the Physical layer, also known as Layer 1 or L1; the media access control (MAC) RLC/PDCP layer, also generally known as Layer 2 or L2; and/or the Network layer, also known as the RRC Layer, layer 3 or L3). At different layers, RRM handles radio resources at different time scales and uses different mechanisms.

For example, at L1, the network node implements RRM using the Channel State Indicator (CSI) based on measurements of downlink (DL) reference signals (RSs) (e.g., CRS or CSI-RS in LTE) made by the UE. In response to a CSI request, the UE sends the measurements (e.g. Reference Signal Received Power (RSRP) and Reference Signal Received Quality (RSRQ) to the network node using Physical Uplink Control Channel (PUCCH) or Physical Uplink Shared Channel (PUSCH) feedback control. These values may be used for Hybrid Automatic Repeat Request (HARQ) and/or power control.

At L2, CSI-related feedback, such as Buffer Status Report (BSR) and Power Headroom Report (PHR) in LTE systems using MAC Control Element (MAC CE) in the PUSCH in response to a Scheduling Request (SR). L2 RRM may also use PUCCH for UL and DL scheduling, and link adaptation.

At L3, RRM uses event-driven or periodic triggering to obtain L1 filtered RSRQ/RSRQ measurements and then L3 filtered RSRQ/RSRQ measurements as defined by the 3GPP standard TS 36.300. L3 RRM filters DL RSs (e.g., Cell-specific RS or CRS) obtained from the UE for mobility-related channel quality measurement and uses measurement reports obtained through L3 Radio Resource Control (RRC) signaling messages from the UE to the network, and the related HO trigger (e.g. A3, A2, A4, A6 events as defined by 3GPP TS36.331/TS36.133, etc.). L3 RRM is normally controlled by the network in RRC_ACTIVE state or by the UE in RRC_IDLE state.

SUMMARY

An example communication device includes a transceiver having a level one (L1) processing element coupled to the transceiver and configured to measure downlink (DL) or uplink (UL) reference signals from multiple beams received via the transceiver to generate L1 data describing the multiple beams. The device also includes a level two (L2) processing element configured to combine, consolidate, select, or filter the multiple beams responsive to the L1 data to produce L2 data corresponding to one or more of the multiple beams in a first cell that are consistent with preconfigured parameters. Furthermore, the device includes a level three (L3) processing element coupled to the L1 and L2 processing elements and configured to generate L3 data corresponding to one or more of the multiple beams in each of the first cell and a second cell. The device also includes a report generator coupled to the L1, L2 and L3 processing elements and configured to generate a report for a mobility event.

In another embodiment, an example communication device includes a transceiver having a level one (L1) processing element coupled to the transceiver and configured to measure downlink (DL) or uplink (UL) reference signals from multiple beams received via the transceiver to generate L1 data describing the multiple beams. The device also includes a level two (L2) processing element configured to combine, consolidate, select, or filter the multiple beams responsive to the L1 data to produce L2 data corresponding to one or more of the multiple beams in a first cell that are consistent with preconfigured parameters. Furthermore, the device includes a level three (L3) processing element coupled to the L1 and L2 processing elements and configured to generate L3 data corresponding to one or more of the multiple beams in each of the first cell and a second cell. The device also includes a report generator coupled to the L1, L2 and L3 processing elements and configured to generate a report for a mobility event. The device includes a decision unit that incorporates UL, DL, or their hybrid measurements from L2 or L3 or both processing units, and signaling message generators to exchange messages with other TRP/gNBs or with UE to facilitate the hybrid mobility decision.

DETAILED DESCRIPTION

Figure 1:
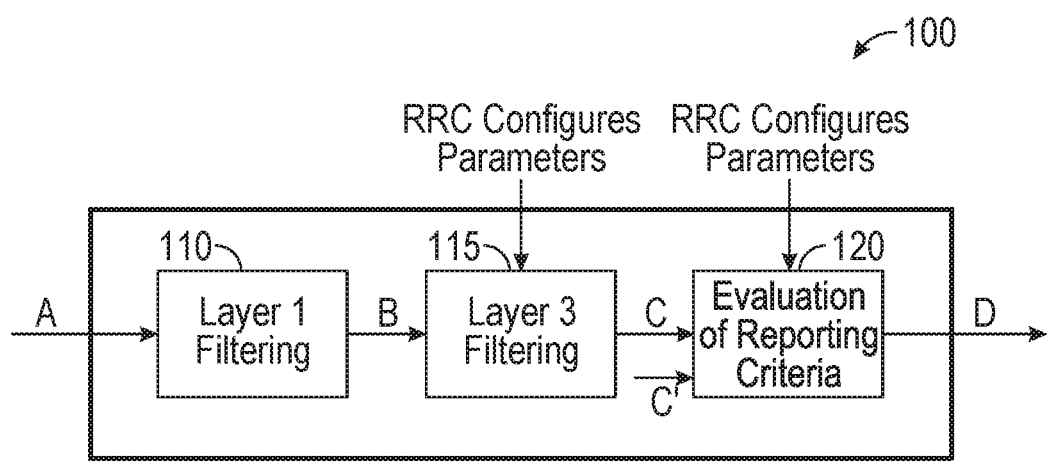
FIG. 1 is a block diagram illustrating a standardized omnidirectional LTE L3 model with RRC involvement.

In the following description, reference is made to the accompanying drawings that form a part hereof, and in which is shown by way of illustration specific embodiments which may be practiced. These embodiments are described in sufficient detail to be enabling to those skilled in the art and it is to be understood that other embodiments may be utilized and that structural, logical and electrical changes may be made without departing from the scope of the present disclosure. The following description of example embodiments is, therefore, not to be taken in a limited sense, and the scope of the present embodiments is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to processing elements or modules, which may be software, hardware, firmware or any combination thereof. Multiple functions may be performed in one or more processing elements as desired, and the embodiments described are merely examples. The processing elements may include software executed on a digital signal processor, ASIC, microprocessor, or other type of processor operating on a computer system, such as a personal computer, server or other computer system, turning such computer system into a specifically programmed machine.

In the emerging fifth-generation (5G) wireless systems referred to as new radio (NR), beamforming is used to implement radio links through techniques such as Spatial Division Multiple Access (SDMA) and deployment for single frequency or multi-frequency (e.g. both HF (high frequency) and LF (low frequency) channels, including carrier aggregation (CA) and dual connectivity (DC)). Given its narrower directional transmission and reception compared to existing omnidirectional (sub-6 GHz LTE LF) implementations, RRM for beamforming system includes beam management (BM) functions such as beam determination (e.g. alignment, selection, switching, refinement, and tracking, etc.), beam measurement, beam reporting and beam sweeping, etc. These functions are typically performed at least at L1 and L2. BM related radio measurement and RRC can be considered part of the new radio RRM. This new RRM may use new reference signals in both uplink (UL) and downlink (DL), and for both cell-specific and user-specific signals. It is desirable to have a uniform framework for all the RRM and mobility scenarios in NR alike. Similarly RRM and mobility are end-to-end operations over the air involving a UE device and a network node (e.g., a gNB, or a Transmit and Receive Point (TRP)) and their interactions.

In addition to beamforming, 5G wireless systems may operate in full-duplex or half-duplex modes either in the same frequency band or in different frequency bands. Both the transmitter and receiver may employ digital, analog or hybrid beamforming techniques to define an aligned transmitter (Tx)-receiver (Rx) beam pair that forms a stable or useable beam pair link (BPL). In an aligned pair, the antennas of the receiver are configured to form a beam that has approximately the same beam "axis" as the corresponding beam from the transmitter. Analog beamforming aligns the axes of the respective Tx and Rx beams. Digital beamforming is mathematical involving eigenvalue/vector computations for the Tx and Rx beams. In full-duplex mode, both the TRP and the UE may employ beamforming in which case, there may be two beam pairs between the UE and the TRP. A single pair of Tx and Rx beams normally uses the same frequency band, however multiple pairs of beams having different frequencies can be used by the same UE-TRP simultaneously, for example, when TRP and/or UE are configured for carrier aggregation. As used herein, the term beam-pair refers only to a Tx-Rx pair of beams. In some examples, either the TRP or the UE may not employ beamforming. These examples may also employ beam pairs, where one beam is omnidirectional and the other beam is directional due to beamforming. As used herein, the term beam may refer to a single beam formed using multiple antennas of one device or to an Rx-Tx beam pair.

The number of different modes in which a 5G system may operate complicate the implementation of mobility events such as handover, beam switching, etc. In current systems, handover is usually between eNBs. In a 5G system as described above, there may multiple handover scenarios, as described below with reference to FIGS. 4 and 5. In order to understand the role of the management to implement mobility events in a 5G system, it is helpful to understand how handover occurs in existing systems.

The 3GPP TS 36.842 and TS 36.300 standards define the RRM for HetNet dual connectivity (DC) mobility and DL mobility RRM. This RRM introduces criteria such as event trigger condition, metrics for measured values of RSRP or RSRQ, that include relative comparison or comparison with thresholds for mobility scenarios such as slave to master (S2M) and master to slave (M2S) handover, where a small cell may be turned on or off at L1, or changes in connectivity at L3. As described below, 5G RRM differentiates between beam management and mobility management, and provides a uniform framework for RRM and mobility for different mobility scenarios, that are defined in the 3GPP radio access network work group 2 (RAN WG2 or RAN2) agreement. Furthermore, the example 5G RRM scenarios described below are adaptable to new mobility scenarios and to the handling of combinations of multiple beam pairs from the same TRP/Cell or across different TRPs/Cells. Considerations for these examples include how or whether to average over time the measurements for a channel defined by a single beam pair or by different beam pairs. The examples described below are not limited to popular RRM criteria such as time average of received quality of multiple beams by the UE without knowledge of the beam alignment status (before alignment or after). They define concrete measurement criteria for specific scenarios, e.g., UL vs. DL mobility, intra-cell inter-TRP vs. inter-cell/inter-gNB mobility, and provide an adaptive or uniform hybrid framework to adapt to many NR mobility scenarios, (e.g., no intra-cell inter-TRP (UL and DL) mobility (termed L2 mobility here), and implement a new L2 module with a new RRM filter and report trigger in place of or in concentration of more costly and slower L3 mobility. The L2 module may replace the L3 module (e.g. the L3 RRM filter and L3 RRM reports) for mobility without RRC involvement or for L2 beam management, or the L2 module may concatenate or integrate with the L3 module for mobility with RRC involvement. These examples also define a hybrid RRM configurable framework that accommodates legacy (e.g. DL measurement based) or future (e.g. DL and UL measurement based) mobility scenarios alike. For example, with hybrid UL and DL based RSs. UL RRM and mobility in the examples of the framework described below can be used to compensate DL RRM and mobility for the less timely DL RSs (e.g., the less frequent transmission of a DL RS) in NR than in LTE, and hence, to achieve better power consumption control.

In addition to conventional handover from one eNB to another, the example mobility management framework described below which operates in the hierarchical architecture of NR considers other types of mobility events such as "beam switching" (e.g. inter-TRP, inter-cell and/or inter-gNB) as mobility management (MM) behavior rather than just beam management (BM). Beam management is sufficient for mobility management when beam switching among pairs with the same UE and different TRPs/cells/gNBs can work without involving slow signaling at the upper layers or inside the core network. This would only occur, however, mostly when the TRPs/gNBs are strictly synchronized.

Figure 4:
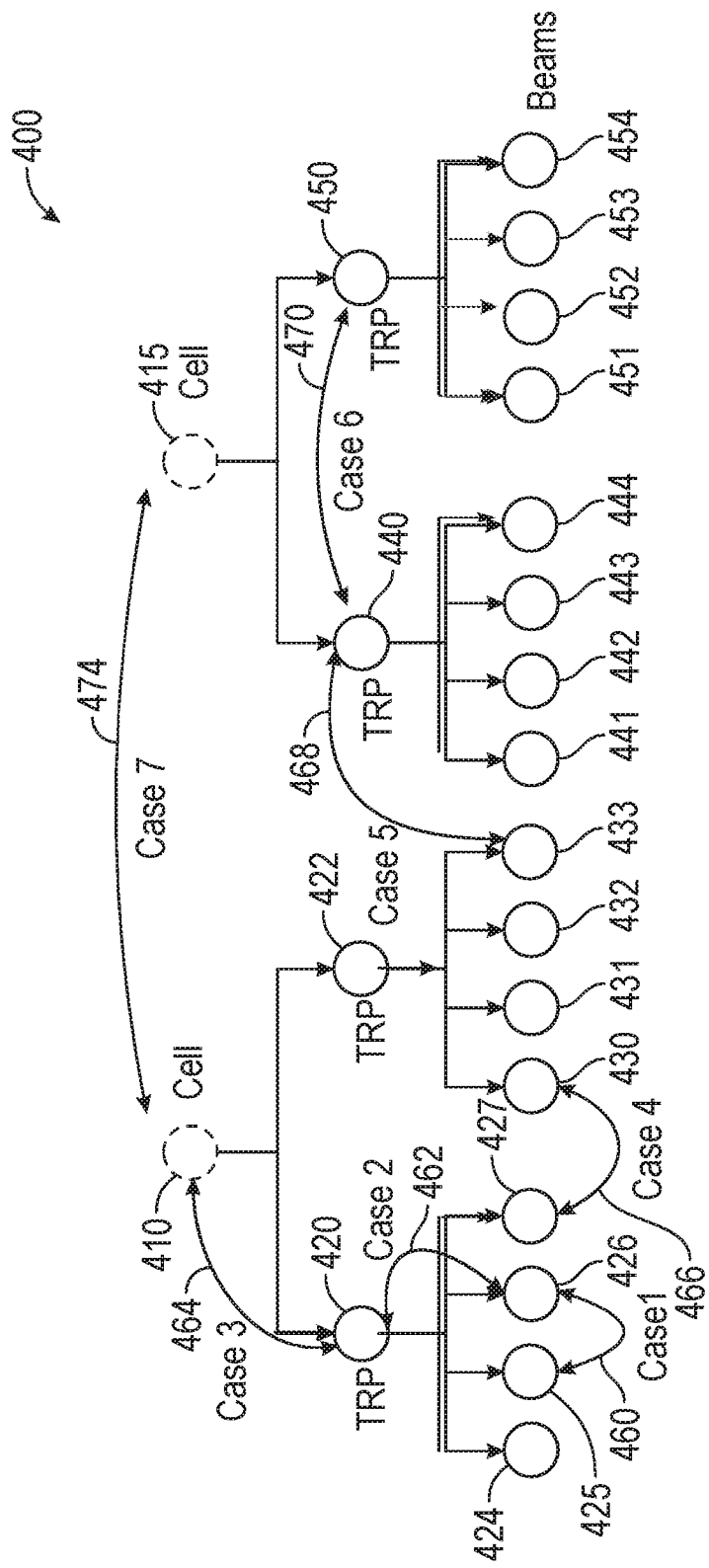
FIG. 4 is a chart illustrating a hierarchically organized (intra-TRP/cell) beam management and (inter-TRP/cell) mobility management for different scenarios according to an example embodiment.

FIG. 4 is a chart illustrating an example scenarios showing how TRP/cell-level MM and beam-level beam management may be implemented in the hierarchical organization defined by the RAN2 agreement. The system 400 is one example that includes two physically adjacent and partially overlapping cells 410 and 415. Cell 410 includes TRPs 420 and 422. TRP 420 includes beams 424, 425, 426, and 427. TRP 422 includes beams 430, 431, 432, and 433. Cell 415 includes TRPs 440 and 450. TRP 440 includes beams 441, 442, 443, and 444. TRP 450 includes beams 451, 452, 453, and 454. The number of beams shown for each TRP is for a simplified illustration, and TRPs may have many more beams than those shown.

Figure 5:
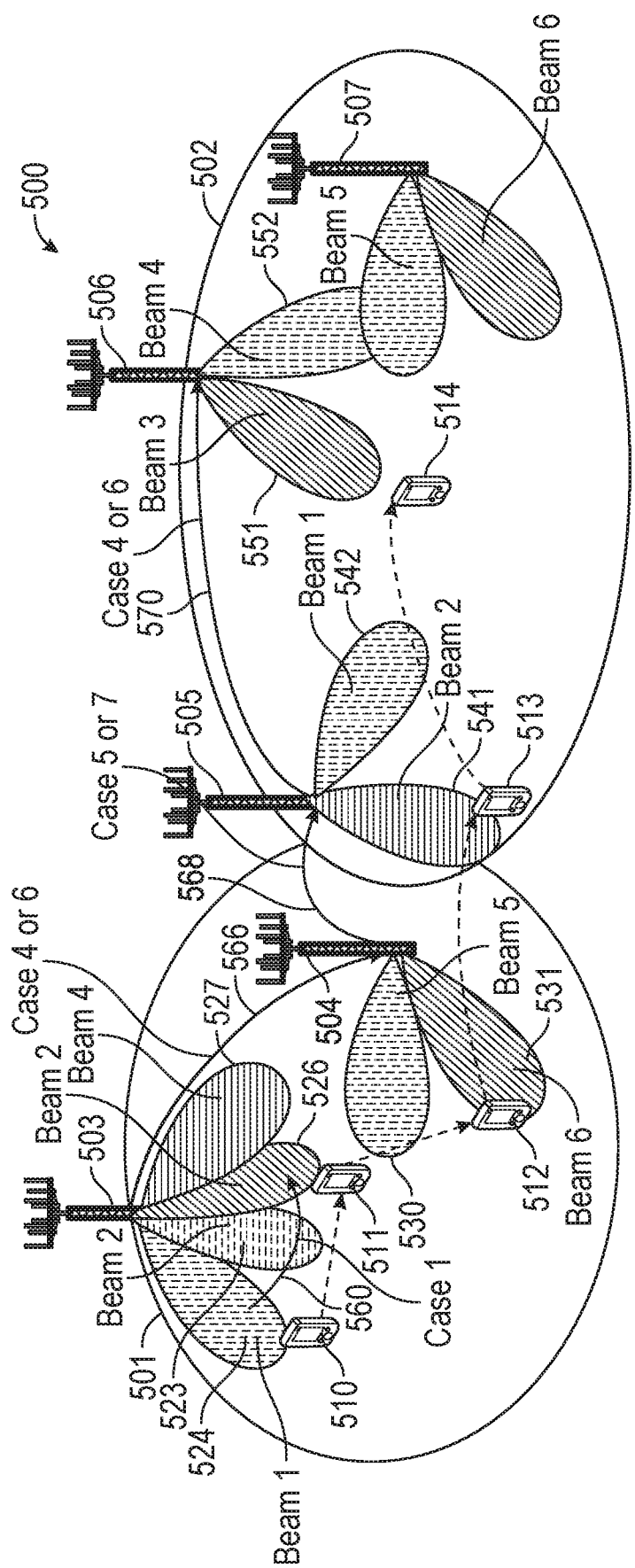
FIG. 5 is a graphical illustration of the hierarchical beam/mobility management scenarios of FIG. 4 according to an example embodiment.

A system similar to that shown in FIG. 4 is illustrated graphically at 500 in FIG. 5 with cells 501 and 502, and TRPs 503, 504, 505, 506, and 507. Note that both FIG. 4 and FIG. 5 include multiple beams and multiple TRPs, as well as a UE moving between multiple positions indicated at 510, 511, 512, 513, and 514. Cell 501 includes TRPs 503 and 504. TRP 503 includes beams 1-4 indicated at 524, 525, 526, and 527. TRP 504 includes beams 530 and 531. Cell 502 includes TRP 505 with beams 541, 542. Cell 502 also includes TRP 506 with cells 551, 552. Note that not all beams are shown in the graphical representation 500.

The scenarios shown in FIG. 4 involve beam management, mobility, or both beam management and mobility, depending on how the multiple links of the UE dynamically change (e.g., with the same or different TRPs or cells) as the UE moves to different positions. Several cases are illustrated involving intra TRP or intra-cell beam management and TRP or cell-level mobility management. An example of intra-cell or intra TRP beam management is illustrated by cases 1-3. In case 1 at 460, the UE switches beams from beam 425 to beam 426. This switch is made at the TRP 420, as shown by, case 2 at 462, and at the cell 401, as shown by case 3 at 464. Case 3 may be associated with L3 mobility management if TRP 420 is anchored differently from cell 410 (say, in a physically separate gNB). Otherwise case 3 is associated with L2 beam management. For example, case 3 may represent a fallback from a narrow-bandwidth beam anchored at TRP 420 to an omnidirectional beam anchored at cell 410. Similarly case 2 can be considered as an intra-TRP beam management case involving L1 only, or both L1 and L2. Case 4 at 466 illustrates an intra-cell, inter TRP beam switch, in which the UE switches from beam 427 of TRP 420 to beam 430 of TRP 422. Case 5 illustrates a beam switch from beam 433 of TRP 422 to the omnidirectional beam of TRP 440, where both cell 410 and 415 are implemented in a single network device such as gNB/CU/DU. Case 6 at 470 shows switching between the omnidirectional beams of TRPs 440 and 450. Case 7 shows the handover from cell 410 to cell 415. System 500, shown in FIG. 5, includes similar cases as indicated at 566, 568, and 570. The cases shown in FIG. 4 are described in more detail below with reference to FIGS. 5 and 7.

In CA (carrier aggregation) based multi-connectivity for example, depending on which carriers originate from which TRPs. For example, when both carriers originate from one TRP, MM may be handled by beam management only. When, however, a secondary component carrier (CC) originates from another TRP or cell, L2 (different TRP) or L3 (different cell) mobility may be considered.

Figure 3A:
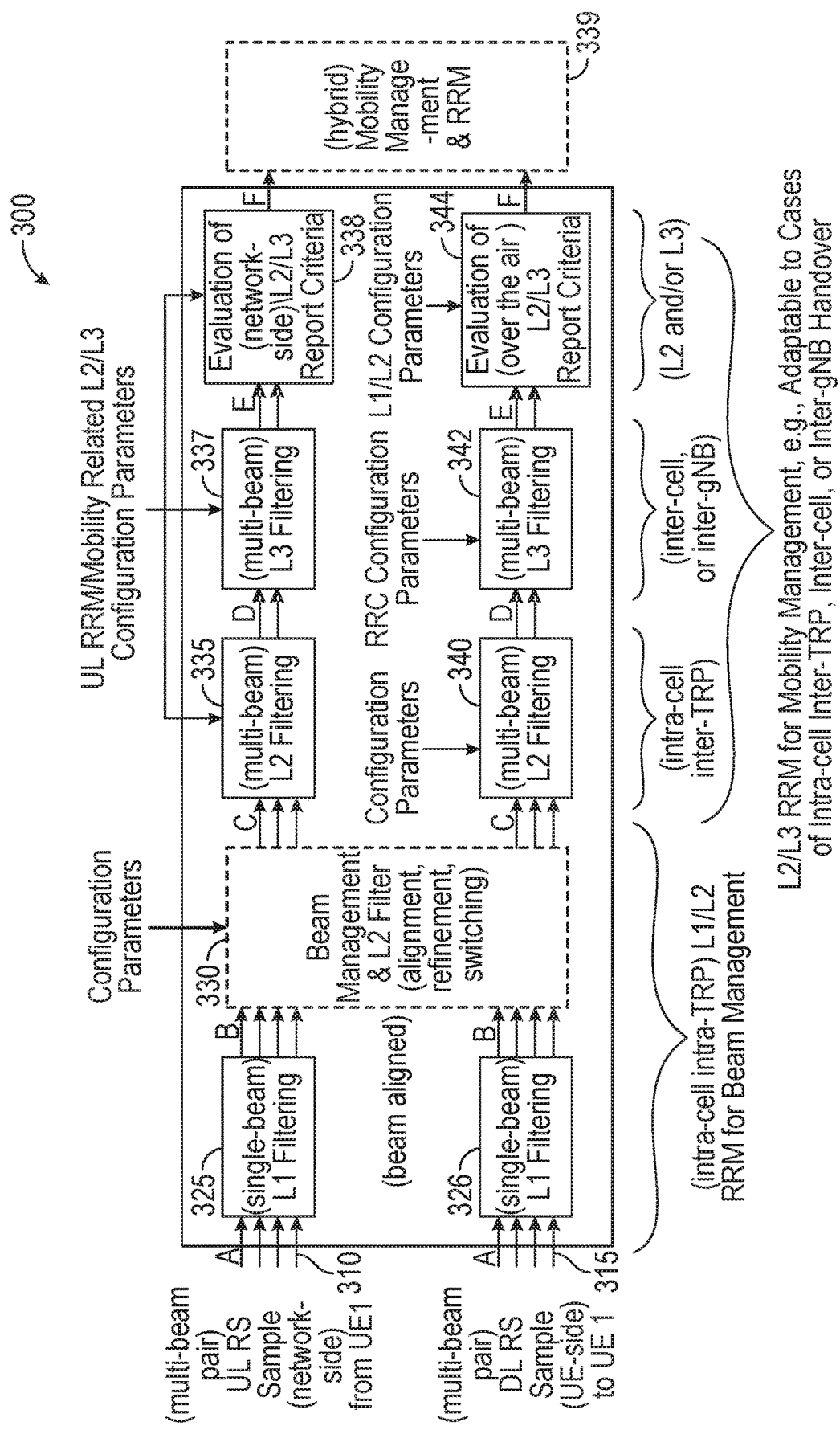
FIGS. 3A, 3B and 3C are block diagrams of an example model having a common framework for logically separating beam management functions from mobility management functions, and logically integrating DL, UL, and hybrid RRM measurements for (hybrid) mobility management according to an example embodiment.
Figure 3B:
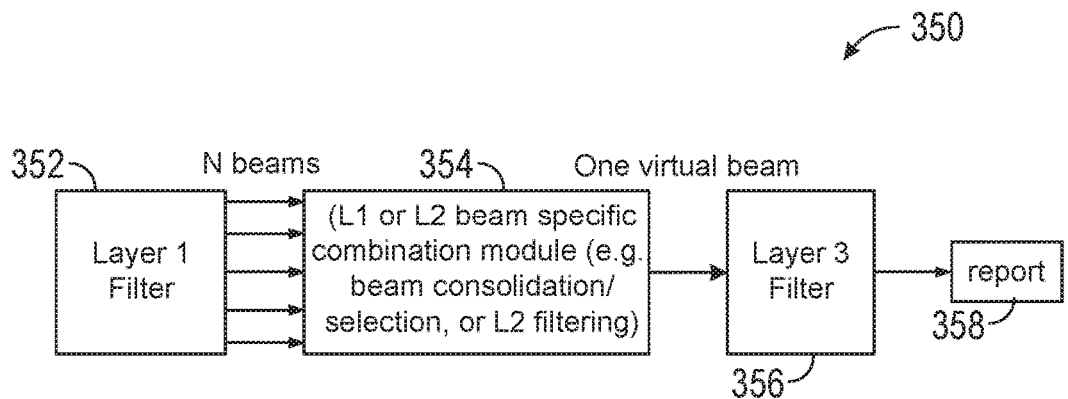
Figure 3C:
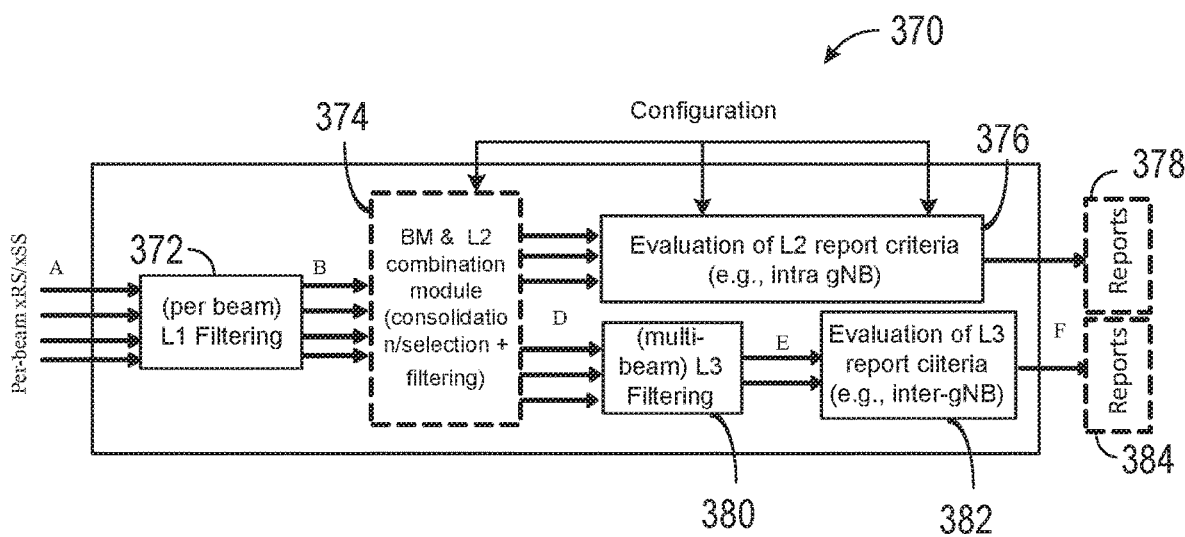
Figure 10:
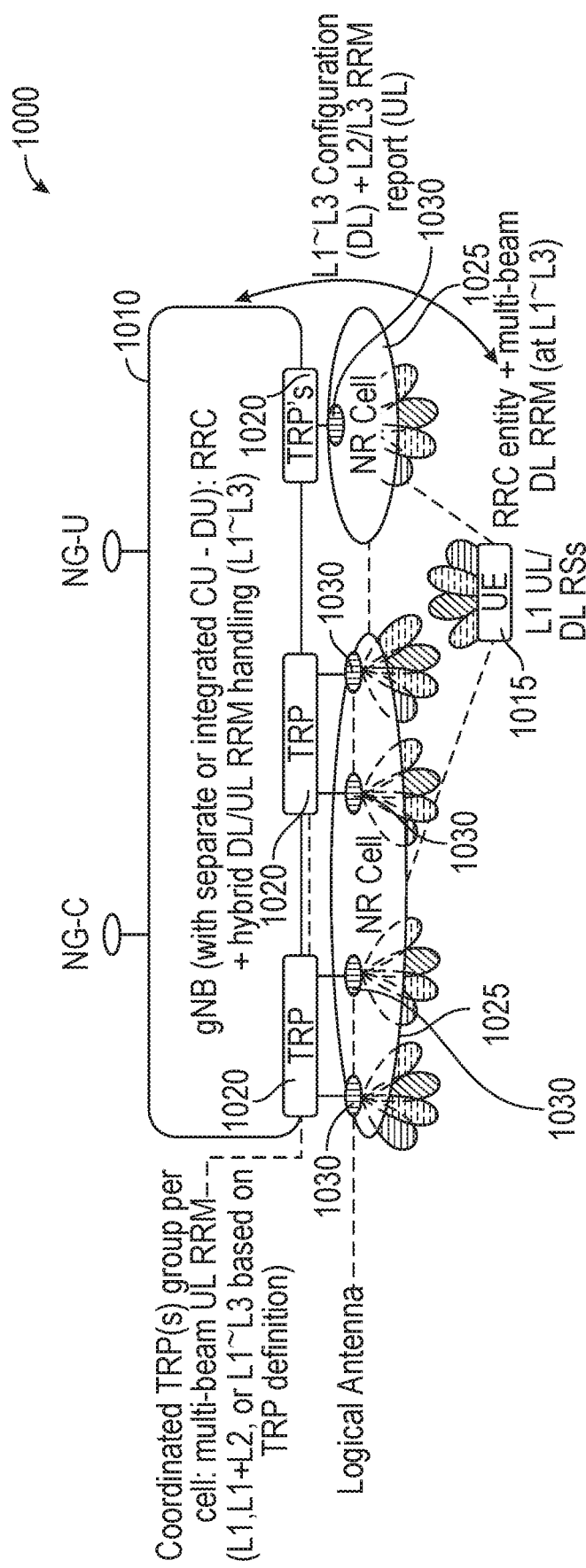
FIG. 10 is block diagram illustrating a proposed further embodiment of a hybrid mobility and RRM system framework according to an example embodiment.

FIGS. 3A, 3B and 3C are examples of a common framework for multi-beam radio resource management (RRM) for use in a system such as the system 1000, shown in FIG. 10. The example embodiments shown in FIGS. 3A, 3B and 3C implement hybrid mobility in a network that uses various beam-formed beams. The common framework may include a separable beam management (BM) process that measures via a user equipment (UE) and/or a TRP, both DL and UL reference signals for mobility management (MM) over a single beam pair or multiple aligned beam pairs. The device (e.g. UE and/or TRP) measures the reference signals then reports the measurements to the other device (e.g. TRP and/or UE).

In general, multiple beam pairs between the UE and the TRPs in the same or different cells may be measured and the results combined. Layer 2 (L2) and layer 3 (L3) RRM measurement criteria and filter functions are defined and report trigger checked for scenario specific setups. A hybrid of inter-TRP or inter-cell/gNB (next generation Node B, 5G, or any equivalent node in other systems). The MM scenarios described herein are handled adaptively and configurably. New configuration flows and control message may be sent over the air or inside the network.

In the examples described below beam management (BM) functions are performed as a part of the beamforming process within the definition of the NR cell. BM is used to implement intra-cell beam switching between a UE and a TRP within the cell. Higher level (e.g. L2 or L3) mobility management (MM) functions that result in inter-cell beam switching and/or intra-cell and/or inter-cell service node switching, involve performing radio resource management (RRM) functions at L2 or L3 based on the NR cell definition, performing beam (pair) combination (e.g. consolidation/ selection) to derive the best stable beam pairs or cell-level channel quality, which involves multi-beam (pair) measurements, or cell-specific measurements after the BM module identifies the stable aligned beam pairs between a UE and one or multiple TRPs. In the examples described below, BM and MM functions are logically separable from each other and logical RRM functions are distributed between BM and MM.

Each of the following examples includes framework for multi-beam RRM and hybrid mobility that may have the following features. Each of the UE and TRP measures the reference signals (RSs) from each other TRP and UE for MM over a single or multiple aligned beam pairs between the TRP and the UE. These measurements are reported with a separable BM process. Multiple beam pairs between the UE and the TRPs in the same cell or in different cells are measured, and results combined at L2 (same cell) and/or L3 (different cells) to derive cell-level or TRP-level RRM measurements for MM purposes. The particular implementation of the framework defines L2 and L3 RRM measurement criteria, combination methods (e.g. multi-beam consolidation, selection, and filtering), and report trigger.

When the framework is used with MM scenarios that are a hybrid of inter-TRP or inter-cell/gNB, the following MM scenarios are handled adaptively and the framework is configured using a configuration protocol flow, that includes: hybrid UL/DL mobility, purely DL or UL mobility; one or multiple TRPs per cell, one or multiple cells per gNB, etc.; LF and/or HF, single-carrier or multi-carrier, or single band or multi-band; single connectivity or multi-connectivity by DC or CA; L2 only, L3 only, or both L2 and L3 filtering entities at different network nodes, with or without clear separation of and at BM and MM; concrete L3 and/or L2 (filtering) functions, and locations of L2 and L3 entities with network nodes, or any of their hybrid combinations; any orthogonally defined L2/L3 signaling (e.g., by Dual Connectivity RRC signaling from LF anchor nodes, or by MAC-layer control element (CE), MAC-layer uplink control information (UCI), MAC layer downlink control information (DCI), etc.); and/or any combination of the above by weighted functions or any listed configurable functions and/or concatenated sub-modules.

In various embodiments regarding the L2 concept in the example frameworks 300, 350 and 370 (shown in FIGS. 3A, 3B and 3C), different assumptions may impact the definitions but not the generality of the framework. In mobility management (MM) vs. beam management (BM) for multi-beam hybrid mobility operations, a beam-level BM process (for example: beam alignment, beam pair selection, beam switching and beam tracking between the UE and the same TRP) can be associated with or be independent from MM at the TRP or cell-level. Note that L2 BM may be considered to be MM without RRC involvement. In these embodiments, L2 BM may also be known as L2 MM. The MM for his type of beam switching may be characterized by less strictly synchronized node (TRP/cell/DU/CU/gNB) change. RRM for BM is assumed to be separable from RRM for MM by RRM process, by used RSs (e.g., xSS/xRS, including CSR0RS, demodulation RS or DMRS, SS block, PSS/SSS), and/or by measurement, filtering, and report criteria, etc. As shown by the embodiment in FIG. 3C, the difference in BM and MM RRM processes (374 to 376/378, or 374 to 380 and 382/384) can be configurable, where each of the processes 374, 376, 380, and 382 can be selectively disabled (e.g. be turned on or off) or adaptively merged with other processes independently or simultaneously depending on the mobility event. In one embodiment, the L1 process 372 may disable the L2 and L3 processes, 374, 376, 380, and 382 when the data provided by the L1 process 372 indicates that the mobility event is an intra-TRP beam switch. Similarly, the L1 process 372 and or L3 processes 380 and 382 may selectively disable the L2 process 376 when the mobility event is an inter-gNB/CU handover. Alternatively, the framework 350 may be controlled by a control processor that selectively disables the L2 and/or L3 processes as described above in response to a particular mobility event.

However, the measurement process, filtering, and report process can be shared between the two as much as possible in the same uniform RRM framework as shown in FIG. 3A and its derivative embodiments, shown in FIGS. 3B and 3C. The examples described below define the cell and L2 MM and BM with a specific embodiment of radio access network (RAN) structure and deployment scenario. These scenarios are non-limiting; other scenarios may be implemented within the examples 300, 350, and 370 of the framework.

The examples 300, 350, and 370 of the framework shown in FIGS. 3A, 3B and 3C each include multiple blocks. These blocks represent processing elements that may be implemented as programmed processors, special-purpose processors (e.g. application specific integrated circuits (ASICs), field programmable gate arrays (FPGAs), programmable logic arrays (PLAs), etc.), and/or as program modules running on a single processor or group of processors (e.g. a multicore processor). An example processor is described below with reference to FIG. 12.

The concept of a "Cell" has not yet been fully defined for 5G. "Cell" is defined as below for one or more embodiments leading to an embodiment of a corresponding "L2" definition. The example definition of a Cell assumes a gNB, CU, and/or DU based definition where each cell has a unique "cell" ID and one or multiple synchronized TRPs. One gNB or CU may handle one or multiple DUs and cells and each DU may correspond to a separate cell. The definition also assumes that RRC is at L3 "cell" level, say, anchored at gNB/CU. In the materials that follow, references to gNBs may also refer to CUs. Furthermore, the definition assumes that beam pairs between a single UE and different TRPs in one cell or in different cells are distinguishable by some physical ID, RS definition, or by their configurations, etc. In this instance, intra-cell inter-TRP or intra-CU inter DU/inter-TRP "beam switching" is considered to be an L2 TRP-level MM behavior with inter-DU/TRP context or data forwarding rather than just L1 BM. Regardless of different embodiments or assumptions, as used herein, L2 does NOT involve radio resource control (RRC). As used herein, L3 does involve RRC.

In general, RRM for MM may be at L2 for intra gNB and inter-cell switching (e.g. when there the gNB includes multiple cells) or at L3 for inter-gNB node switching. In an embodiment described below, TRPs are not distinguishable within one cell. For this example, L2 intra-cell inter-TRP switching (i.e., L2 MM) degenerates to purely L1 BM because the TRPs are effectively combined into a single virtual TRP. (e.g., using Cooperative Multiple Point Tx/Rx). The embodiments below concern BM handled at L2, as shown in the new L2 module (330, 335, 340 in FIG. 3A, 354 in FIG. 3B, 374 in FIG. 3C) for beam combination (e.g., consolidation/selection, filtering), which can be considered part of MM (L2 or L3 MM) with network-side inter-node context or data forwarding, or purely L2 BM without such context or data forwarding.

Thus, the L2 MM procedures may be at intra-cell inter-TRP or inter-cell, depending on how a cell and TRP are implemented in a particular RAN architecture. The L2 MM procedures may also depend on the TRP-specific or cell-specific reference signals used in the RAN. For different embodiments, L2 RRM may be at the MAC layer or the MAC/RLC/PDCP layer, or it may disappear or degenerate to purely L1 or PHY layer.

For the sake of brevity, the descriptions of the examples provided below use acronyms. Table 1 provides the meaning of these acronyms.

TABLE 1

| | |
|---|---|
| 3G | Third Generation |
| 3GPP | Third Generation Partnership Project |
| 4G | Fourth Generation |
| 5G | Fifth Generation (NR) |
| ARQ | Automatic Repeat Request |
| BLER | Block error rate |
| BM | Beam Management |
| BPL | Beam pair link |
| BRRS | Beam refinement reference signal |
| BSR | Buffer Status Report |
| CA | Carrier Aggregation |
| CC | Component Carrier |
| CDM | Code Division Multiplexing |
| Cell | Traditionally, a logically independent entity of static geographical and L1-L3 radio coverage by a LTE eNB or one of its "sectors" on a specific frequency, but in 3GPP NR standards, the term "cell" is yet to be defined and its formation may be based on beamforming and may be dynamically UE-centric, which may be considered a logic entity covered by a single TRP, a group of independent TRPs (synchronized), or one gNB (with its logical components of CU and DU) or a single DU controlling a group of TRPs. |
| CH | Channel |
| CN | Core Network |
| CRS | cell specific reference signal |
| CSI | Channel State Information |
| CU | Central Unit |
| DC | Dual Connectivity |
| DCI | Downlink control information |
| DL | Downlink |
| DU | Distributed Unit |
| ESS | Extended synchronization signal |
| FDM | Frequency Division Multiplexing |
| FDMA | Frequency Division Multiple Access |
| gNB | Next generation Node B (may include one CU and/or one or more DUs) |
| HARQ | Hybrid Automatic Repeat Request |
| HetNet | Heterogeneous Network |
| HF | High Frequency |
| HO | Hand Over |
| HOF | Handover Failure |
| LF | Low Frequency |
| LTE | Long Term Evolution |
| M2S | Master to Slave (HetNet) |
| MAC | Media Access Control |
| MAC CE | MAC Control Element |
| MBSFN | Multicast broadcast single frequency network |
| MM | Mobility Management |
| Network device | A eNB, GNB, CU, DU TRP or other device communicating with a UE |
| NextGen | Next Generation (CN) |
| NR | New Radio (e.g., 5G) |
| NSA | Non-standalone |
| PBCH | Physical broadcast channel |
| PDCP | Packet data convergence protocol |
| PHR | Power Headroom Report |
| PSS | Primary synchronization signal |
| PUCCH | Physical Uplink Control Channel |
| RAN | Radio Access Network |
| RAN1 | Radio access network working group 1 (WG1) |

TABLE 1-continued

| | |
|---|---|
| RAN2 | Radio Access Network Working Group 2 (WG2) |
| REQ/RSP | Request Response |
| RLC | Radio link control |
| RLF | Radio Link Failure |
| RLM | Radio Link Management |
| RRC | Radio Resource Control |
| RRH | Remote radio head |
| RRM | Radio Resource Management |
| RS | Reference Signal at L1 (could be UL uplink or DL downlink) |
| RSRP | Reference Signal Received Power |
| RSRQ | Reference Signal Received Quality |
| S2M | Slave to Master (HetNet) |
| SDMA | Spatial Division Multiple Access |
| SR | Scheduling Request |
| SSS | Secondary synchronization signal |
| TDM | Time Division Multiplexing |
| TOS | Time of Staying |
| TRP | Transmission And Reception Point |
| TTT | Time To Trigger |
| UCI | Uplink control information |
| UDN | Ultra-dense network |
| UE | User Equipment, or device |
| UL | Uplink |

FIG. 1 is a block diagram illustrating an omnidirectional (i.e. no beamforming) LTE RRM model with L3 RRC configuration and L3 RRC measurement reporting at 100. Model 100 includes an L1 filter element 110, an L3 filtering element 115, and an evaluation of reporting criteria element 120. The L3 filtering element 115 and reporting criteria element 120 utilize network-configured parameters for handling (receiving, measuring, and reporting on) DL reference signals from the network at each respective layer (e.g. L1 and/or L3) to manage resources.

The examples below use several different types of reference signals. The 3GPP standard describes several physical layer reference signals, including a cell-specific RS (CRS), a Multicast broadcast single frequency network RS (MBSFN RS), a UE specific Demodulation RS (DMRS), a UE specific RS, a positioning RS, and a channel state information (CSI) RS, etc., collectively referred to as xRS. Example reference signals also include the primary synchronization signal (PSS), the secondary synchronization signal (SSS), the extended synchronization signal (ESS), SS block, SS burst, SS burst set, etc. collectively referred to as xSS. Further L1 reference signals may include the physical broadcast channel (xPBCH), beam reference signal (BRS), beam refinement reference signal (BRRS), etc. This list is not meant be exhaustive. Other reference signals known under the 3GPP standard or the emerging 5G standard may also be used.

In NR the RRM should take into account the L1-L3 characteristics of one or more beam-formed links for both LF and HF or their hybrid, and/or both UL and DL mobility or the hybrid. The RRM analyzes a reference signal within each beam to provide TRP-level or cell-level radio quality based on beam-specific radio quality. The RRM uses this information along with filtering models, measurement configuration for triggering intra TRP beam switching, inter-TRP beam switching, intra gNB and/or inter gNB handover.

As described above the concept of a "cell" has yet to be defined in the emerging 5G NR RAN. Thus, a 5G cell may include one or multiple TRPs in a gNB that may be logically partitioned to have a Central Unit (CU) and one or multiple Distributed Unit (DUs), each of which controls one or more of the TRPs in the gNB. Furthermore, given the evolving CN (Core Network) architecture in 5G, many different mobility scenarios exist including at least inter-cell inter-gNB (with RRC involvements), intra-cell inter-TRP (no RRC involvement), and yet-to-be defined inter-cell intra-gNB (with or without RRC), etc. Each of these mobility scenarios may applies to scenario-dependent network deployments such as standalone NR (with respect to LTE), non-standalone (NSA) NR, standalone HF UDN (Ultra Dense Network), and/or LF assisted HF. In short, the new RRM and mobility schemes accommodate or adapt to the (underlying) beam management, the new RAN/CN architecture, and concrete deployment scenarios.

Figure 2:
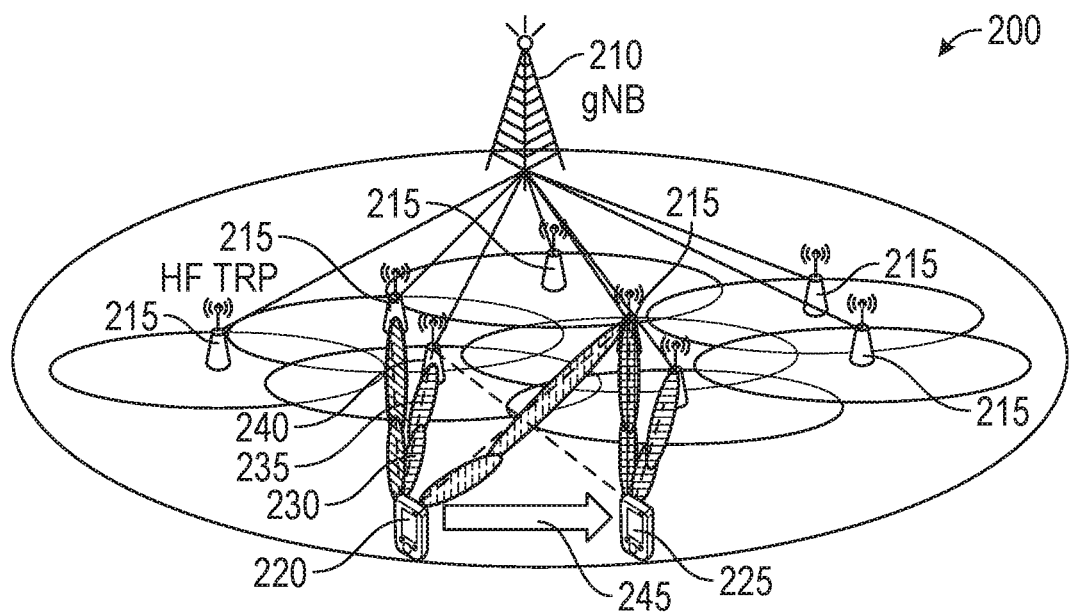
FIG. 2 is a block diagram illustrating an intra-cell mobility scenario with high frequency (HF) aligned beams between one UE and one or multiple TRPs (Transmission and Reception Points) according to an example embodiment.

Due to the use of a beam-formed channel (CH) and reference signal (RS) at L1 in the NR mobility scenarios and a need for layer 2 (L2) mobility (intra-cell, as embodied by a single gNB coverage with a group of supporting TRPs) as illustrated in system 200 shown in FIG. 2, UL mobility, NR HF and LF multi-connectivity by dual connectivity/carrier aggregation (DC/CA), etc., the example framework is designed to handle RRM and for hybrid (e.g., UL+DL, HF+LF, L2+L3) mobility. L2 here may roughly relate to the media access control (MAC) layer, but is not limited thereto.

The NR scenario 200, shown in FIG. 2 includes a gNB 210 communicating with multiple TRPs 215 illustrated as HF TRPs with coverage areas indicated as ellipses in the perspective view shown (circles in a top view). A UE, moves from one location to another, shown by 220 and 225. HF beams are also illustrated as aligned with HF beams from the UE and TRPs. For example, a Tx or Rx beam 230 from UE at 220 is oriented in the same direction (e.g. along approximately the same beam axis) as a corresponding Rx or Tx beam 235 from TRP 240. The beams 230 and 235 are referred to as aligned beams or as an aligned beam pair. Several other instances of aligned beams are also illustrated in FIG. 2. Note that in this example, the UE at 220 has three aligned beams, possibly simultaneously, with three different TRPs, reflecting what is called a "multiple connectivity or multi-connectivity" scenario in 5G NR. The UE at 225 in one embodiment is shown as a shift of the UE at 220 to a different position as represented by arrow 245. As shown, this shift results in different sets of aligned beams with the same (e.g., beam switched) or different (e.g., mobility incurred) TRPs.

It is contemplated that the current relatively high-overhead (per-subframe) cell specific RS (CRS) in LTE may be replaced with a lower-overhead RS. The ongoing 5G development will result in a new NR RS, architecture, including signaling at RAN or CN. An RRM architecture for TRP level mobility or Cell-level mobility for NR with the same UE but a different serving TRP, cell or gNB/DU/CU uses a new LTE-based framework to efficiently handle RRM and mobility for multiple beam-formed cells.

In various embodiments, 5G NR beam forming brings new mobility scenarios for which RRM and mobility are not yet well defined. The embodiments utilize coexisting LF and HF, aggregated by CA (single carrier or multiple carriers) or DC, multi-connectivity of the same UE with multiple TRPs or multiple cells involved during the dynamic setup or mobility modification, emerging UL mobility, and hybrid UL and DL mobility, etc.

Each "cell" or each TRP may have multiple (service or feasible) beam pairs to the UE during its time of staying (TOS) as illustrated in FIG. 2. To the UE, overall channel quality of a cell or a TRP often depends on multiple Tx-Rx beam pairs, not a single omnidirectional radio link as in existing LTE implementations.

To implement the example framework, the L2-L3 RRM measurement triggers, metrics, configurations, measurement models, and report processes may be redefined, utilizing an L1 multi-beam reference signal sampling model that is similar to the unidimensional LTE model. It is noted that mixing beam management and mobility together may result in a performance penalty including high mobility HOF/ping-pong and signaling overhead.

The example framework defines logically separate functions for each level (L1-L3). These functions are logically separated utilizing a common framework for multi-beam NR RRM and hybrid Mobility as an extension to the omnidirectional LTE model as illustrated in a block flow diagram at 300 in FIG. 3A. Uplink and downlink RRM and mobility processing is divided into two paths 310 and 315 respectively, each handling multiple beam pairs. Uplink block 310 performs L1 RS sampling at the network side based on reference signals sent from a UE. Downlink block 315 performs L1 RS sampling at the UE side for reference signals sent from the network. Both paths provide per-beam L1 filtering for all the beam pairs at 325 and 326 to provide measurement results for use by the L1/L2 beam management block 330 which uses the regular BM operations (including determination, alignment, refinement, recovery and beam switching, etc.) and a new (L2 RRM) filtering module for intra-cell or intra-TRP L1/L2 RRM.

As used herein, the term "filtering" indicates an analysis and selection process by which the channel quality of multiple connections are compared either to a threshold or to each other and/or are summarized or averaged. The result of the filtering is a mobility report indicating one or more connections that may be suitable for usage. The selected beams and/or the quality measurements are sent in the reports to the network side where the beams or beam pairs are configured to implement the switch or handover. The report may be provided to the other device to complete the connection selection process. For example, the reports generated by the UE may be sent to the TRP and vice versa.

Mobility management and RRM functions can be logically separated from those for beam management. In blocks 335, 337 and 338, the L2/L3 functions may be controlled by UL RRM/mobility related L2/L3 configuration parameters, which may be adapted for intra-cell inter-TRP beam switching, inter-cell intra-gNB handover, and/or inter-gNB handover. In the framework shown in FIG. 3A, block 335 performs multi-beam L2 filtering 335 (such as the filtering of channel quality for an individual beam pair, or more generically the multi-beam "filtering" operation for multi-beam combination, including multi-beam consolidation/selection to find the best usable beams for MM purposes). Block 337 performs multi-beam L3 filtering, block 338 performs evaluation and network-side L2/L3 report generation.

DL L2/L3 mobility management and RRM are implemented using blocks 340, 342 and 344. Block 340 implements multi-beam L2 filtering, with functions similar to those of block 335, block 343 implements multi-beam L3 filtering and block 344 implements evaluation of the L2/L3 data and report generation. Blocks 340, 342 and 344 are adaptable to cases of intra-cell inter-TRP beam switching, inter-cell intra-gNB handover, and/or inter-gNB handover.

The L2 filtering performed in blocks 335 and 340 addresses L2 multi-beam and mobility management. The framework architecture logically separates beam-level RRM L1/L2 beam management (BM), from TRP-level or cell-level RRM for L2/L3 mobility management (MM). The L2 filtering handles TRP/cell/gNB changes without RRC involvement but possibly using RRC configuration.

In one embodiment, the filtering performed by blocks 335 and 340 considers only aligned beam pairs. if a "cell" has one TRP, these blocks can be selectively disabled or they may be adaptively merged with the respective cell-level L3 filtering 337 and 342. The disabling and/or merging of the processes in FIG. 3A may occur in the same way as described above with reference to FIG. 3C. If a cell has multiple TRPs that are not distinguishable by the UE, for example, blocks 335 and 340 may be merged with BM's L2 filtering at block 330. In other embodiments. L2 filtering functions may be merged with L3 filtering functions (e.g. block 335 with block 337, block 340 with block 342, block 330 with block 335 and block 337, or block 330 with block 340 and block 342). L2 (and L3) filtering criteria can be similar to legacy L1 or L3 filtering. Alternatively, a new function of multiple beam pairs and of hybrid (e.g., UL or DL) metrics may be defined. BM may have the same or different (RS) inputs. L2 filtering functions, and measurement report and evaluation criteria as in omnidirectional LTE MM modules. In different embodiments, L2 RRM for BM and for MM can be correlated, concatenated (as shown in FIG. 3A), or independent, separated, or in parallel.

FIG. 3B is a block diagram of another example framework 350. In this embodiment, each beam pair of all of the detectable beam pairs has a dedicated L1 filter 352, but L3 filtering 356 is applied to combined single or multiple beams after L2 combination processing 354. The processing 354 is performed after L1 filtering 352 but before L3 filtering 356. The combination processing 354 performs at least beam consolidation/selection of the beam pairs provided by the L1 filtering 352. As shown in FIG. 3B, in this option, the result of the Layer 1 filter 352 for each beam (pair) is input to combination processing 354 to obtain beam level measurement results. After the combination, one consolidated beam or cell quality result is input to L3 filter 356. The example combination processing 354 may be part of L1/L2 beam management, e.g., beam switching and beam tracking, but it may also perform newly added operations such as beam combination, e.g., multi-beam consolidation and selection for RRM purposes. Data generated by the L1 filter 352. L2 combination module 354 and/or L3 filter 356 is processed by the report generator 358 to provide a mobility report.

Alternatively in the example framework shown in FIG. 3B which works for either DL or UL based RRM measurements. Each beam pair has a dedicated L1 filter. L3 filtering, however, is applied to combined beams after a new (L2) combination module which is configured after the L1 filtering but before the L3 filtering and at least performs beam consolidation/selection. The L2 combination processing 354 may process only the N (best) beam pairs (e.g. the processing 354 may align, switch and track the N beams having the highest RSRP/RSRQ provide information on those N beams instead of providing one virtual beam to the L3 filter 356. This configuration of the framework 350 may be advantageous, for example, in high frequency systems. In these systems, channel variation may be relatively large and individual beams may not be detected by UE consistently due beam blockage that may occur due to one or more obstacle intermittently in the path between the TRP and the UE. In these circumstances, the L3 filtering 356 may not work well due to intermittent L1 filtering results caused by the blocked beams. In addition, the detected and L1-filtered beam pairs may oscillate due to transient CH dynamics, which may cause a ping-ponging among the beams if the individually filtered beams or beam pairs are directly used for mobility decisions. The framework shown in FIG. 3B may be implemented in a UE device or in a network node device such as a TRP, eNB, gNB/CU, etc.

FIG. 3C is a block diagram of yet another example framework 370 for either DL or UL based RRM measurements, where each beam pair has a dedicated L1 filter. After the L1 filtering a new (L2) combination module can be applied to consolidate/select/filter beams, e.g., either independently for mobility (reports) without RRC involvement, or coherently with L3 filtering for other mobility scenarios. In this framework, using DL RRM for example, each beam pair has a dedicated L1 filter 372. After the per-beam L1 filtering L2 combination processing may be applied at block 374. The combination processing applied by block 374 depends on whether the target mobility is intra-gNB/CU or inter gNB/CU. For intra-gNB/CU mobility, the block 374 may consolidate, select and/or filter beams output by the L1 filter 372. The filtering performed by block 374 can work independently, for mobility report generator 378 without RRC involvement. The L2 processing 374 may also operate coherently with L3 filtering and report generation described below with reference to blocks 380 and 382. The framework shown in FIG. 3C may be implemented in a UE device or in a network node device such as a TRP, eNB, gNB/CU, etc.

As described above, because the RRM framework shown in FIG. 3C has configurable input signals, measurement parameters, measurement processes and measurement report formats, the UE-side measurement processes may be used for BM or MM with corresponding input reference signals (e.g. xRS/xSS). In some embodiments, this model may enhance the widely adopted LTE RRM model to increase stability of the handover/beam switching.

With the framework from FIG. 3A~3C, we get a new uniform RRM module of at least the following features:

A new (L2) RRM module is be adopted in-between L1 filtering and L3 filtering to combine beams either independently for mobility (measurements and reports) without RRC involvement, or coherently with L3 filtering for other mobility scenarios.

The (L2) RRM beam combination module includes functionalities not only for beam consolidation/selection, but also for (L2) filtering of beam measurements at least for mobility without RRC involvement.

For different mobility scenarios without or with RRC involvement, a uniform RRM model can be adopted with configurable xRS/xSS inputs, filtering parameters, and reporting processes.

The example framework 370 shown in FIG. 3C may receive multiple beams at the UE. The input to the L1 filter 372 may be the xRS/xSS measurements (samples) of multiple Tx/Rx beam pairs. Based on the deployment scenarios, UE states, and corresponding configuration, the L2 processing block 374 may implement the higher level functions of L2 (e.g. evaluation of beam pairs for intra gNB beam switching/mobility). A block 380 may implement the lower level functions of L3 (e.g. filtering). Both block 374 and block 380 have, as input data, the output data of the L1 filter 372. The example framework provides a mechanism for implementing intra-gNB mobility without RRC involvement. Block 374 uses L2 filtering and reports which may be faster than RRC processing. As stated in the RAN2 agreement, the concrete BM operations (such as beam switching, etc.) are transparent to RRM in this model, but they are the foundation for the new RRM functions in this new module, e.g., the (L2) multi-beam filtering and combination (consolidation/selection) performed by block 374.

The example framework 370 also performs L3 filtering and generates reports to implement inter-gNB mobility with RRC involvement. In the framework shown in FIG. 3C, block 380 performs the L3 filtering, block 382 evaluates the filtered beams and the L3 report criteria to generate data for the reports 384. Thus, the lower part of the RRM model framework shown in FIG. 3C may be applied for inter-gNB handoff.

The L2 combination module 374 may degenerate to the commonly used averaging/filtering of, or may implement a multi-beam combination (e.g., beam consolidation/selection) for deriving a stable cell-level quality for mobility purposes beyond normal BM behavior (e.g., beam alignment, beam switching, and beam recovery, etc.). The L2 reports provided by report generator 378 and/or L3 reports provided by report generator 384 can be used accordingly to generate DL RRM reports to the network side.

The reduced number of data paths from the interface "B" to "D" to "E" to "F" in FIG. 3C is the result of filtering beams or beam pairs. This filtering may include combination functions such as identifying and selecting the "N" best beams for the beam switch or handover, or it may include deriving cell-level quality from all perceived beams by sum or time average, etc. The selected beams and/or the quality measurements are sent in the reports to the network side where the beams or beam pairs are configured to implement the switch or handover.

In one configuration, at point "D" in FIG. 3C, there may be N input data paths to the L3 filter 308, representing the N best beams to be used based on cell-level quality.

In one configuration, each of the beams or beam pairs at point "E" in FIG. 3C correspond to a preconfigured number of beams for the derived cell level quality. Alternatively, the beams or beam pairs at point "E" may represent the filtered beams above certain relative or absolute thresholds. In either case, the beams at point "E" are the beams to be reported to the network-side. Although not shown, the interface at point "E" may accommodate different input events as in the C and C' events defined for omnidirectional LTE.

In different embodiments of the framework shown in FIGS. 3A-3C, the MM reference signal inputs to the L2 combination/consolidation/selection processing 354 and/or 374 be the same reference signals used by the L1 filtering blocks 352 and 372, described above. Alternatively, the L2 processing may use reference signals defined in the same way or differently from the reference signals used for omnidirectional LTE MM and/or may use an L1 filtering that is different than the filtering used for omnidirectional LTE MM. In one embodiment, the new multi-beam (L3/L2) RRM model and examples 300, 350 and 370 of a hybrid mobility framework for NR TRP/cell-level mobility adapts to different scenarios of NR cell structure, layer-decoupled BM and MM, coexisting UL and/or DL mobility, single-connectivity and multi-connectivity. Hybrid mobility module 339 and its RRM functions may combine the (reported DL and collected UL) measurements for the purpose of handover or TRP selections. A block similar to block 339 may be coupled to receive the reports from the report generator 358 of the example framework 350 or the reports from the report generators 378 and 384 of the example framework 370. The reports provided to block 339, or the similar blocks for the example embodiments shown in FIGS. 3B and 3C, may be sent to one or more hybrid decision units located on the network side (e.g. TRP/gNB/CU), for example using PUCCH or PUSCH. the hybrid decision units process the reported data from L1, L2, and/or L3 processing elements to derive a uniform cell quality and to trigger mobility actions at the corresponding layers.

In some embodiments, the handling BM independently from MM may allow the use of a newly defined L2 filter that may be selectively disabled. The RRM may be used for (L2/L3) intra-cell TRP selection or inter-cell handover, and can be logically separated from the RRM used for beam-level or sub-cell level or intra-TRP (L1/L2) beam management. This separation may be beneficial because of the differences in timescales, beam alignment status, beam-formed RRM measurement signals, beam metrics, beam configuration and usage flow. For example, L1/L2 processing is typically faster than L3 processing because L3 processing uses RRC.

In various embodiments, a multi-beam RRM model and hybrid mobility framework, as described above with reference to FIGS. 3A, 3B and 3C provides reliable measurements and combinations of multiple aligned (synchronized and managed) beam pairs of each UE and/or TRP. These examples of the framework, however, is not restricted to using beam pairs that are aligned/trained/refined during BM process. The models and examples 300, 350, and 370 of the framework focus on RRM measurements of multiple qualified and aligned candidate beam pair(s) to obtain the TRP or cell level quality, and allows certain modules to be selectively disabled or merged according to the type of beam switch/handover that is occurring (e.g., UL only, DL only, hybrid; LF only, LF and HF; L2 only, L3 only, or L2 and L3 filtering and reporting) and according to the system environment (e.g., intra-cell inter-TRP or inter-cell) in which the beam switch/handover occurs.

In one embodiment, RRM defines measurement criteria for MM that, in turn, defines the L2/L3 functions (e.g., multi-beam measurement for report triggering, filtering rules, hybrid metrics, weighting rules) used by the examples 300, 350, and 370 of the framework.

For TRP selection or inter-TRP/intra-cell mobility, for example, RRM measurement criteria for MM may include L2 functions that check a trigger condition, functions that generate a weighted combination, and/or functions that combine multiple pairs of Tx-Rx beams between a UE and a single TRP or different TRPs in the same cell. For inter-cell or inter-gNB/eNB handover, the examples 300, 350, and 370 of the framework include similar L2+L3 functions of multiple aligned beam pairs to identify candidates for beam switch/handover between the UE and one or multiple (multi-connectivity) TRPs in the cell.

In one embodiment, a hybrid RRM framework for hybrid mobility, such as the examples 300, 350 and 370 of the framework described above, distributes and integrates hybrid L2-L3 RRM criteria and entities at one network node (e.g. TRP, gNB. CU. DU, etc.) or at different network nodes. For example, L1-L3 UL RRM signal measurements may occur at the network-side while L1-L3 DL RRM signal measurements occur at the UE side. The examples of the framework also handle different mobility scenarios, for example, multi-connectivity (CA, DC, etc.), multiple frequency bands (LF and/or HF), different layers (L2 vs. L3), etc. The reference signals and configuration parameters used to implement these scenarios are combined and adapted to implement a flexible and efficient RRM.

The example configurable frameworks 300, 350 and 370 for adaptive multi-beam RRM and hybrid mobility may also provide L1-L3 signaling flows over the air or inside the network that enable a multi-beam-formed, hybrid mobility process. For example, the examples of the framework take configuration parameters for L2. L3, or both from the network, with or without UE preferences, to adapt to dynamically hybrid mobility scenarios. For example, the UE may automatically generate reports for (L2 OR L3), or (L2 AND L3), and for beam, TRP, or cell level filtering. The UE can turn on or off certain sub-modules while operating in the multi-beam RRM model. The examples 300, 350 and 370 of the configurable framework can also maintain forward and backward compatibility with the legacy single-carrier omnidirectional DL mobility implementations, for example, by disabling the L2 processing and UL processing. These examples of the framework are also compatible with multi-beam hybrid mobility schemes that may be developed in the future, for example by allowing for both UL and DL mobility processing.

The example configurable frameworks 300, 350 and 370, and the configuration described below with reference to FIG. 10, have at least the following features:

- All allow adoption of different measurement objects (e.g., xRS/xSS signals) of UL or DL or both for the purpose of BM or MM or both, and configurable operations including measurement objects, beam combination, filtering criteria, trigger criteria, reporting, and MM process.
- By this flexible measurement and mobility configurability in a uniform RRM and mobility framework, the following become feasible: gNBTRP can reuse UE-side measurements of common objects (xSS/xRS) for different purposes (i.e., BM vs. MM) through flexible configuration methods;
- The configuration of UE measurement can be at L3 for MM with RRC involvement, or at lower layers otherwise, e.g., L2/MAC or L1;
- Given the same measurement objects, neighboring gNBs/TRPs can coordinate and be aligned in their MM measurement configurations, including configurations of RRM filtering criteria, control or data beams, report triggers, and (RX/TX) beam patterns, etc.:
- RRM measurement reports for BM can be at L1/L2 and include beam level quality, while the RRM measurement reports for MM can be at L3 (with RRC involvement) or L2 (without RRC involvement) and can include only cell-level or combined beam quality from serving and neighboring cells.

Note that the examples 300, 350, and 370 of the configurable framework, described above that implement multi-beam RRM with hybrid mobility and separated beam management and hybrid mobility can be applied to other embodiments. For example these examples of the framework may be applied to non-5G/NR cellular wireless systems that may employ beamforming, or to omnidirectional Wi-Fi systems, or any other combination of 4G+5G, 4G+Wi-Fi, etc. Note that similar concepts can be extended to other embodiments or areas of NR system design, including but not limited to multi-beam radio Link management (RLM) and radio Link failure (RLF).

RRM reference signals (RSs) for (UL or DL) MM and for BM are carried in the beams that are to be measured. Example RSs can be beam-specific, UE specific, TRP-specific, or cell-specific. RRM RSs for BM and MM may be the same or different by different embodiments, definitions, or configurations, etc.

Furthermore, L1 sampling or filtering of L1 RRM metrics may be based on measured RS quality and can be vendor specific: The sampling or filtering provide the inputs that are considered TRP-level MM RRM or cell-level MM RRM and include beam-level BM RRM. Depending on embodiments of RSs design, the same or different L1 filtering of RRM RSs can be used for MM and BM.

In the embodiment as shown in examples 300, 350 and 370 of the framework, UL signal based RRM is adopted, where a (beam-formed) UL signal proposed for UL Mobility can be measured by the network. Thus, hybrid UL and DL RRM/MM processing is described. If in another embodiment, no UL mobility is adopted, then the hybrid embodiments described herein may gracefully reduce to DL MM and RRM only, and vice versa by selectively disabling unneeded processing.

A third embodiment of the framework defines and utilizes multi-beam hybrid RRM measurement criteria. RRM measurement criteria defines (measurement and report trigger, filtering rule, metrics to measure, multi-beam or UL-DL combination/comparison/weight methods), with new highlights by examples below for TRP selection or inter-TRP/intra-cell mobility scenario, where a newly defined L2 filter is used. The criteria are used for report generation, trigger check, or comparisons of aligned beam pairs against that from other TRP (in the same cell or not) for mobility decision.

L2 filtering function can be similar to other L1/L3 filtering for proposed for NR RRM such as TS38.133 or TS38.331. In the described embodiments, however, the filtering may be applied to new L2 inputs having aligned beam pairs with the same TRP or cell. The L2 filter can be for example the average of metrics (e.g., the channel quality or RSRQ/RSRQ) of the same beam pair over its service time, or across multiple beam pairs aligned and multiplexed by FDM/TDM/CDM at L2. Alternatively, it may include a comparison of the quality of beam pairs to a threshold (e.g. the absolution value of RSRP/RSPQ in dBm or dB, or relatively with each other within the same cell or between neighboring cells). The L2 filtering function may also involve comparisons between or among the bean pairs, including cross-beam (pair) combinations, selecting a maximum beam pair, or selecting N-beam pairs having the greatest value for the selected metric or metrics. The beam pairs may be aligned/or and multiplexed (e.g. FDM/TDM/CDM) that are ready for or already in service.

For inter-cell or inter-gNB/eNB handover scenario, an L3 filter may be used. The L3 filtering can be similar to existing NR RMM proposals such as the 3GPP TS38.133, TS38.331 proposals. The described embodiments, however apply new inputs, for example multiple aligned beam pairs (ready for or already in service) from one UE to one or multiple TRPs. The TRPs, in turn, may belong to different cells or gNBs (CUs, DUs)/eNBs.

For hybrid RRM scenarios, the examples 300, 350 and 370 of the framework may adopt L2 and/or L3 filtering that is adaptable to different scenarios. As used herein, the particular scenario can also be an input parameter into the filter. For example, when the scenario involves hybrid UL and DL mobility, where TRPs within a cell monitor one or more UL reference signals from a UEs, and/or transmit a DL reference signal to the UE, the hybrid criteria can adopt legacy and/or new filtering functions to UL/DL metrics, and then operate on these metrics. Example operations on the metrics include selective use of filtered UL or DL RRM metrics (e.g. by AND/OR logic operations). For example, a UL beam switch/handover may occur if and only if UL RSRP for the new beam pair is greater than threshold. The beam switch/handover decision may also be based on a weighted combination of filtered metrics, for example, of DL beam pairs with that of UL beam pairs (e.g., by weighted sum-average with UL weighted more than DL), or by proportional comparison, maximum channel to interference ratio (MAX-C/I), or by maximum-minimum fairness criteria. Any of the above may be applied to use or combine UL and DL mobility decisions rather than or in addition to using filtered RRM metrics.

Examples of legacy criteria and L/L3 filter of metrics single beam pairs and multiple beam pairs for DL mobility/RRM include:

(a) selective including logic operations such as AND, OR, maximum, maximum-N{ };
(b) average of (aligned or unaligned) beam pairs over their history in time;
(c) relative comparison against each other:
(d) absolute comparison against thresholds for a certain time period (e.g., LTE TTT or T_reselection), similar to alpha-based LTE legacy L3 filtering and HetNet Trigger, for example S2M A2 or M2S A4;
(e) legacy cell/gNB-level measurement or report triggering but applied across all detected or servicing beam pairs with the UE and all TRPs in the same cell; and/or
(f) legacy measurement or report mechanisms but applied at the TRP level (i.e., across all detected or serving beam pairs with the same TRP).

As with hybrid UL/DL, similar L2/L3 hybrid criteria may be applied (e.g., selective or weighted fair) to other scenarios. for example, (a) multi-connectivity mobility/RRM with metrics from different frequencies integrated by CA (carriers) or DC (LF and HF):
(b) multiple aligned beam pairs from single TRP per cell, or multiple TRPs per cell, or different cells/gNBs:
(c) serial concatenation of or parallel combination from L2 and L3; and/or
(d) aggregation within the same RAT or among different RATs.

As described above, the L2 and/or L3 filtering may apply new criteria (e.g., the aforementioned weighted combination functions) for non-hybrid or hybrid RRM. These criteria may include an L2 and/or L3 filter using a TRP-level or cell-level quality function as described by equation (1).

$$\text{Func}(t) = \text{Func}\_\{i,j\}[\text{beamPairMetrics}\_\{i,j\}(t) | \{i,j\}(t) \text{ meeting some input criteria}] \quad (1)$$

where i(t) and j(t) are the indices to candidate or serving Rx-Tx beam pairs that are aligned/selected by the BM filtering at time t between a UE and possibly one TRP (L2) or different TRPs with the same or different cells/gNBs (L3). Different embodiments of the functions and filters may exist below within the same framework.

The input to an example L2 filter may be given by equation (2).

$$L2\_\text{filter input}\{i,j\}(t) = \arg\_\{i,j\} \text{BM\_output}[\{i,j\}(t)], \quad (2)$$

where BM_output[ ] includes BM-level RRM function, so that {i, j} pair over time is selected by the beam-level BM criteria, for example, the combination of UE-side beam identifier i and TRP-side beam identifier j defines an aligned beam pair at time t, having channel metrics (e.g., RSRP, RSPQ) that are greater than a specific threshold.

The input to the L3 filter may be given by any of equation (3) or (4).

$$L3 \text{ filter input}\{i,j\}(t) = \arg\_\{i,j\} \text{BM\_output}[\{i,j\}(t)] \quad (3)$$

$$L3 \text{ filter input}\{i,j\}(t) = \arg\_\{i,j\} L2\_\text{filtered}[\{i,j\}(t)]. \quad (4)$$

The following are examples of Func_{i,j} [ ], that may be used in equation (1).

$$\text{Func}\_\{i,j\}[\ ] = \text{beamPairMetrics}\_\{i,j\}(t) | \{i,j\} \quad (5)$$

This implies direct measurements of (L2 or L3) RSs.

$$\begin{aligned}\text{Func}\_\{i,j\}[\ ] &= \text{any of the legacy criteria function,} \\ &\quad \text{e.g., max}\_\{i,j\} \text{ or max}\_N\_\{i,j\}, \text{ or} \\ &\quad \text{beamPairMetrics}\_\{i,j\}(t), |\{i,j\} \text{ having beamPair-} \\ &\quad \text{Metrics greater than a threshold;} \end{aligned} \quad (6)$$

$$\text{Func}\_\{i,j\}[\ ] = \text{Weighted\_Fairness}\_\{i,j\} [\text{beamPairMetrics}\_\{i,j\}(t)] \quad (7)$$

For function (6) and (7), multiple beam pairs may be selected/aligned using BM (for L2 filtering) or using the MM filtering for L2 (or L3 filtering), (e.g., using a utility function for proportional or max-min fairness);

$$\text{Func}\_\{i,j\}[\ ] = \text{WeightedSumAverage}\_\{i,j\} [\text{beamPairMetrics}\_\{i,j\}(t)] \quad (8)$$

where: If beamPairMetrics=BM_output=max of all the candidate beam pairs, for example, by max[RSRP_{i, j}(t)], then Func[ ] delivers L2 multi-beam diversity that always selects always the aligned beam pair having the peak characteristic aggregated over time. This is similar to multi-user MAX-C/I scheduling;

If {i, j} (the IDs of the TRP and UE) for a channel do not change over time, then the L2 filter delivers a time average of the channel history over a single-beam pair. One special case is the alpha-based moving average as defined in omnidirectional LTE RRM.

Note that for all the above embodiments of criteria functions or filters, aligned beam pairs may be in service, just ready for service, or reliably established. Null beam pairs (of which nothing is aligned and no signal received reliably) are considered as 0 or "worse" metrics in the criteria.

The examples 300, 350 and 370 of the framework may also use a hybrid filter at L2/L3 having hybrid RRM criteria, using hybrid UL/DL mobility scenario. Examples of such a hybrid filter are described below:

$$\begin{aligned}\text{Func}(t) &= \text{Func}\_\{i,j\}[\text{beamPairMetrics}\_\{i,j\}(t), |\{i,j\}(t) \\ &\quad \text{meeting input criteria for UL or DL(at } L2/L3)] \end{aligned} \quad (9)$$

$$\text{Func}(t) = \text{WeightSumAverage\_func}\{\text{Func}\_\{i,j\} [\text{beamPairMetrics}\_\{i,j\}(t), |\{i,j\}(t) \text{ for UL}] \quad (10)$$

$$\text{Func}(t) = \text{Func}\_\{i,j\}[\text{beamPairMetrics}\_\{i,j\}(t), |\{i,j\}(t) \text{ for DL}](\text{for weighted combination}) \quad (11)$$

$$\text{Func}(t) = \text{Weight\_Fairness\_func}\{\text{Func}\_\{i,j\} [\text{beamPairMetrics}\_\{i,j\}(t), |\{i,j\}(t) \text{ for UL}] \quad (12)$$

$$\text{Func}(t) = \text{Func}\_\{i,j\}[\text{beamPairMetrics}\_\{i,j\}(t), |\{i,j\}(t) \text{ for DL}](\text{for weighted fairness}) \quad (13)$$

Thus, the hybrid filtering functions of hybrid RRM module can iteratively integrate existing L2/L3 or UL/DL filtering functions and modules, or combine them by AND/OR selection. Any other functions using similar ideas here to integrate other hybrid scenarios may also be adopted.

Note that compared to the embodiments criteria with L2, L3, and/or hybrid filtering functions, existing criteria literally mix beam management and mobility management together.

Figure 6:
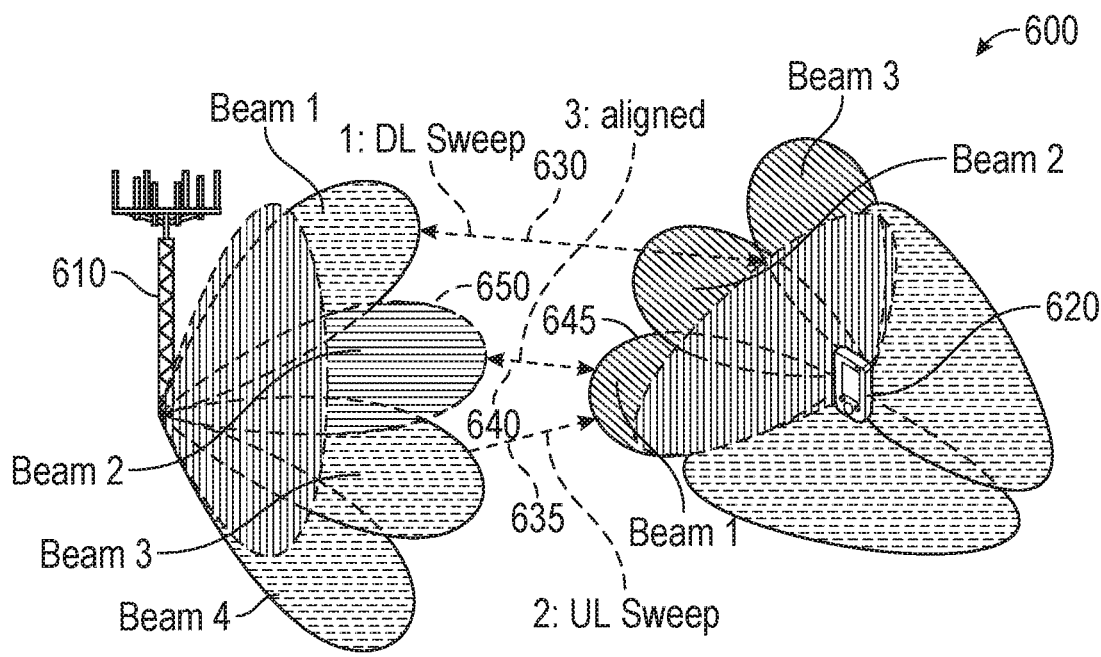
FIG. 6 is a block diagram illustrating initial beam alignment between one UE and one TRP according to an example embodiment.
Figure 7:
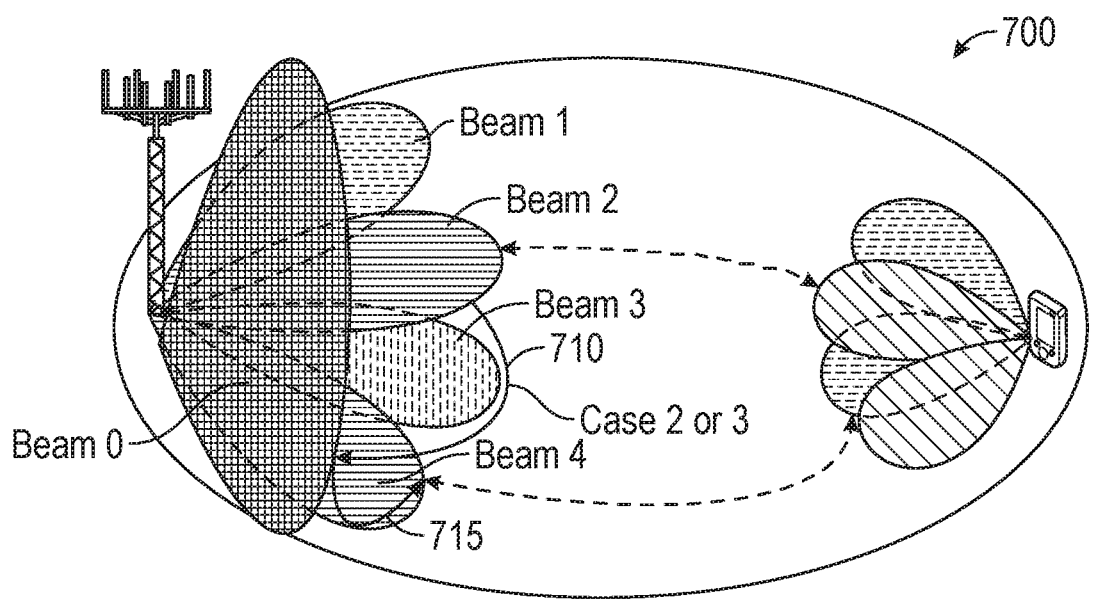
FIG. 7 is a block diagram illustrating intra-cell or intra-TRP beam switching/tracking according to an example embodiment.

Beam management (BM) in the example embodiments 300, 350 and/or 370 of the framework is different from the mixed or inseparable beam switching at the cell or beam level as defined in other NR proposals. BM for the examples 300, 350 and/or 370 of the framework involves initial beam alignment as illustrated in FIG. 6 at 600 where a TRP 610 is shown attempting to align beams with a UE 620, and the beam switching/tracking as illustrated in FIG. 7 at 700. In FIG. 6, a DL beam sweep (e.g., TRP-side beams change from 1 to 4 regularly), as shown by 630, and a UL beam sweep (e.g., UE-side beams change from 1 to 3 regularly), as shown by 635, are performed to identify aligned beam pair(s) as indicated by 640. In this example, the aligned beam pair includes 1 at 645 from UE 620 and beam 2 at 650 from TRP 610.

The BM for the examples 300, 350 and/or 370 of the framework are normally defined at L1, L2 or both. In these examples, L1 beam management refers to beam-specific operations including DL or UL RS transmission, reception, configuration, measurements, beam sweeping, pairing, and possibly vendor-specific L1 filtering similar to existing omnidirectional LTE. Beam management at L2 in the examples 300, 350 and/or 370 of the framework refers to any signaling or control operations related to intra-TRP beam determination, alignment/acquisition, beam switching, refinement (beam level and beam width adjustment), and tracking between a UE and a single TRP. Beam management at L2 specifically refers to operations on multiple beams (pairs) for a specific TRP, while L1 in the embodiment refers to operations on a single beam (pair). L1/L2 Beam Management together refers to intra-cell intra-TRP beam related PHY/MAC operations for a UETRP as illustrated at 600 in FIGS. 6 and 700 in FIG. 7. The TRP in FIG. 6 is marked as 610 and UE as 620. In 700, the beam switching between different pairs of beams from TRP and UE are illustrated via arrows 710 and 715. Such beam switching may be the result of changing signal strengths, quality measurements, or movement of UE 620 for example.

In the example embodiments, L1/L2 BM is differentiated from L2/L3 (or TRP/cell-level) MM at least with respect to the RRM measurements performed. L1/L2 RRM measurement for BM is the measurement and comparison of beams at the same or different levels of beam width from the same cell and same TRP for the purpose of beam operations without involving TRP/cell changes and neighboring TRP/cell measurement and/or selection. RRM mobility management at L2/L3, however, may involve TRP/cell changes and neighboring TRP/cell measurement and/or selection. The L1/L2 RRM beam management processing directly aids beam alignment and (initial) cell selection, etc., (e.g. non-mobility operations). In addition, the L1/L2 RRM BM processing may contribute to handover or cell reselection (i.e., mobility).

Figure 8:
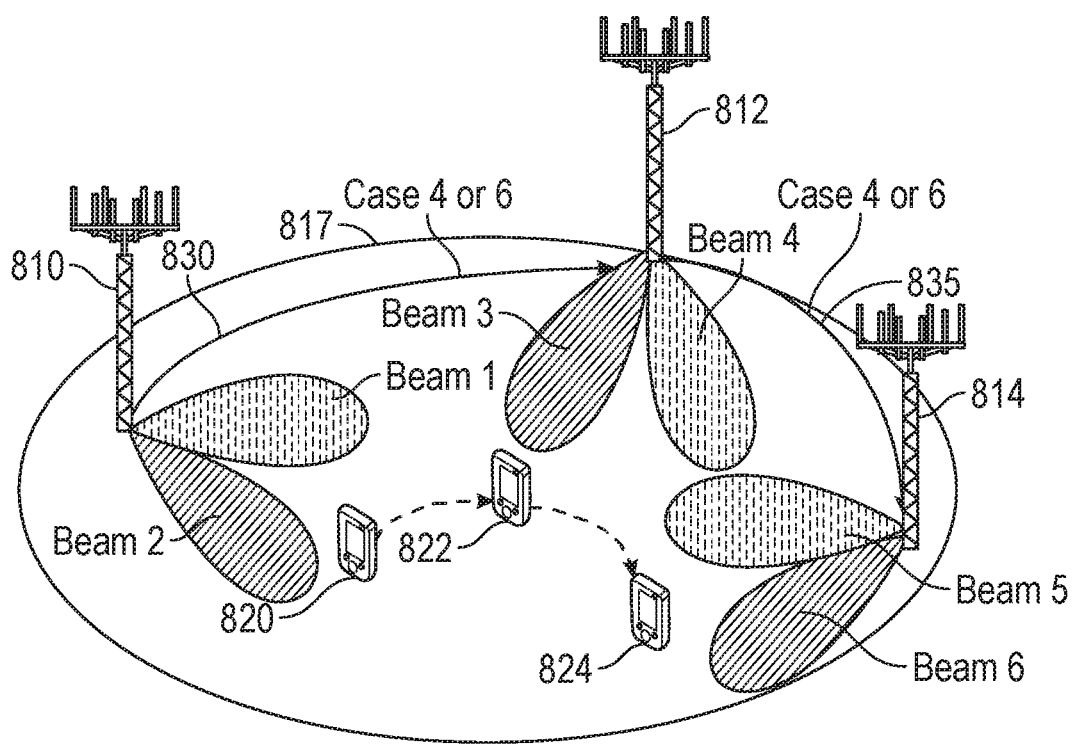
FIG. 8 is a block diagram illustrating intra-cell inter-TRP mobility according to an example embodiment.
Figure 9:
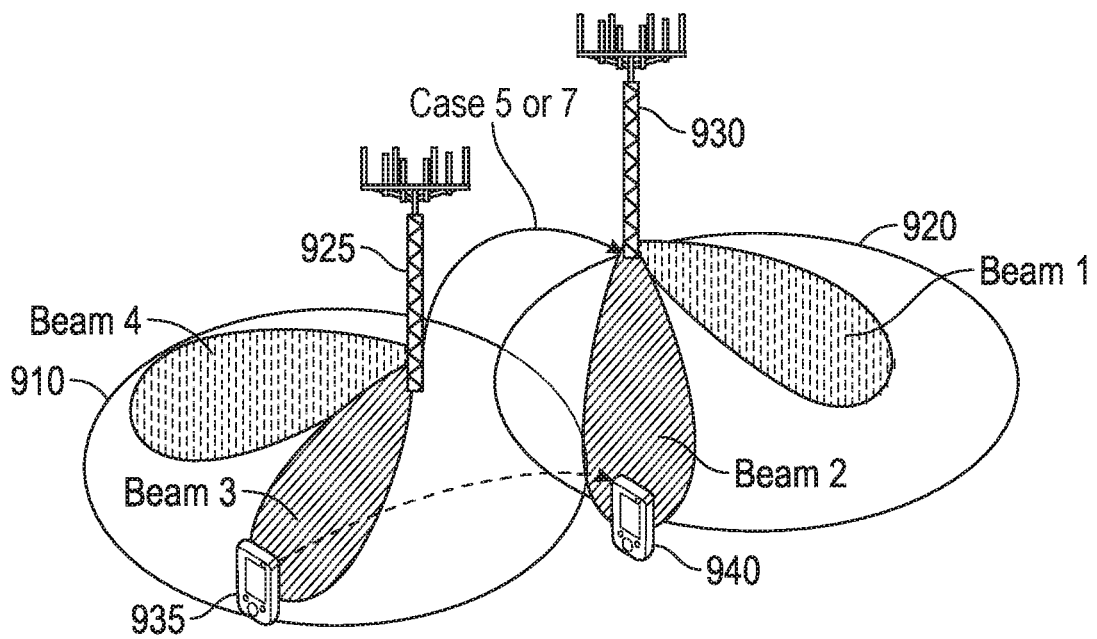
FIG. 9 is a block diagram illustrating inter-cell inter-TRP mobility according to an example embodiment.

FIG. 8 and FIG. 9 illustrate embodiments of mobility management scenarios in a hierarchically organized cell and its mobility management for node switching between or among neighboring TRPs within the cell or among neighboring gNBs/cells. In these embodiments, a "cell" is defined based on a gNB, CU, or DU, where each cell has one or multiple synchronized TRPs and has a unique "cell ID". Assuming only one RRC control entity per cell (e.g., a gNB/CU), L2 mobility is illustrated in FIG. 8 at 800. Three TRPs, 810, 812, 814 are shown with each having multiple beams within a cell 817. A UE is shown as moving among three positions 820, 822, and 824 within the cell 817. The arrows at 830 and 835 in FIG. 8 show case 4 or case 6 that were described above with reference to FIG. 4. Intra-cell inter-TRP mobility, as shown in FIG. 8 is known as L2 mobility by which a serving TRP (set) changes when a UE moves. L2 mobility involves L2 measurement and reporting only without RRC involvement.

FIG. 9, at 900, illustrates another example MM scenario, inter-cell inter-TRP or L3 mobility. Two neighboring NR cells, 910 and 920, include respective TRPs at 925 and 930. A UE moves from position 935 in cell 910 to position 940 in cell 920. Inter-cell or inter-gNB mobility here is the handover or TRP selection between the neighboring cells 910 and 920 that involves RRC signaling, together with underlying L2 and L3 measurement and reporting. When the UE moves across NR cells from 935 to 940, uplink reference signals sent by the UE are received and measured by the TRPs 925 and 930 of the respective cells 910 and 920. The TRPs 925 and 930 are able to uniquely identify the UE using a resources access channel (RACH)-like process that is used for synchronization and/or for ID assignments. When the UE moves across the NR cells, downlink reference signals that may be sent from TRPs of neighboring cells are received and measured by the UE. Even though the TRPs may not be synchronized, the TRPs may be uniquely identified by the UE. As shown by the arrow between TRPs 925 and 930, FIG. 9 illustrates cases 5 and 7, described above with reference to FIG. 4.

In example embodiments 300, 350 and 370 of the framework, beam management (BM) and mobility management (MM) are logically separated by timescale and by functionality. L2/L3 TRP/cell-level mobility and RRM, which involves intra-cell TRP selection or inter-cell handover, is separated from operations and RRM measurements for more transient, (sub-cell level) (L2/L1) intra-TRP BM. This separation is in terms of timescales, beam alignment status, measurement signals, metrics, and usage models. Mobility management differs from beam management because mobility management may be based on longer term TRP/cell-level dynamics. Mobility management may or may not take the results of BM, for example, RRM measurements and beam pair selections, as inputs for further filtering. Mobility management is based on stable UE-TRP beam pairs that have been paired, aligned, and selected by the beam management operations, for mobility purposes.

Due to different time scales and dynamics, channels and beams may vary rapidly, in particular, when the UEs are used in an environment that is prone to blocking of HF links for the Tx beam or the Rx beam. In these environments, the UE performs beam management with the TRP in real time to quickly react to the transient channel variations. Failure of any single beam (pair) doesn't necessarily mean the failure of the overall TRP links to the UE, nor the whole TRP/cell-level signal quality, because, due to the separable BM processing, the failed beam (pair) may be recovered by BM in a manner that is transparent to the upper layers. The example embodiments 300, 350 and 370 of the framework avoid RLF and RLM reports based on transient individual beam-pair failure. These reports trigger a false handover, resulting in HOF and ping-ponging between beam (pairs), resulting in additional UE-network overhead. The example embodiments avoid this additional overhead by reducing L3 signaling and, thus, reducing RLF/RLM reports due to beam-level fast dynamics.

The separation of BM from MM masks volatile, transient channel/beam-level dynamics from the stable upper layers, making mobility design lean and stable. Using the example framework, fast channel/beam-level dynamics can be handled locally and quickly at L1 or L1/L2, with reduced impact to processing performed at the upper layers (L2 or L2/L3) and/or to processing performed by neighboring TRPs/cells. Only TRP/cell-level dynamics at larger time-scaled can trigger a series of slower mobility/handover behaviors that involves multiple TRPs and, thus, significantly more signaling overhead at L2/L3, and potentially larger service interrupt. The separation also allows correlated or independent definitions of RS and RRM for BM and MM.

The separation of timescales described above may be done at L2. The BM and MM operations may each have their own L2 RRM. The BM and MM L2 RRMs may be associated with each other, for example, having shared RSs or by the output of the BM RRM being used as the input to MM RRM. Alternatively, the BM and MM RRMs may be relatively independent, for example using different RSs, or different L2 filtering methods. For example, L2 MM or TRP selection within the same cell may reduce to L2/L1 BM within one cell. This may occur when all of the TRPs in the cell are undifferentiated, for example, all TRPs in a cell have a unique PCI, the same minimum SI, and are strictly synchronized with a single shared MAC entity (ideal backhaul) or with tightly coordinated MAC entities (non-ideal backhaul). Furthermore, the Tx and Rx beams are tightly coordinated among all TRPs.

L2 RRM measurements may involve L2 filtering that is newly introduced to separate the RRM for L1/L2 beam management from the RRM for L2/L3 mobility management. L2 measurement may be done for both BM, for L2 processing (e.g. intra-cell or inter-TRP), and for L3 processing (e.g. inter-cell or inter-gNB) MM. The L2 measurements may include separate measurement signals, signal usage models, filtering parameters, metrics (e.g., CH quality, expected throughput, block error rate (BLER), etc.). These separate measurements may be used, for example, during a change in the serving TRP or cell.

Level 2 BM in the example embodiments refers to beam-specific operations without UE-aware serving node changes. For one of the TRPs in a cell, L2 RRM measurements refer to BM, including RS measurement for intra-TRP or beam-specific beam alignment/acquisition, beam switching, beam level refinements, including beam width, and beam refinement between a UE and a TRP.

The example embodiments may be configured to perform multi-beam L2 (and L3) RRM for TRP-level or cell-level mobility. L2 RRM for MM uses multiple aligned beam. Multi-beam here refers to multiple Tx-Rx beam pairs aligned by BM between a UE and (one or more) TRP(s). L2 RRM and mobility refers to TRP-level operations within a cell, e.g., intra-cell, inter-TRP mobility, where a collection of TRPs that are strictly synchronized and compensated for time-offsets share the same physical "ID." These TRPs may behave as a single "cell."

In the example embodiments, L3 RRM and mobility refers to cell-level operations. L3 mobility refers to inter-cell or inter-gNB (or inter-CU/DU) mobility, where each cell has a collection of TRPs that are synchronized but are not necessarily strictly synchronized among different cells. Typically L3 (RRC) signaling is involved in L3 mobility.

In other example embodiments, a multi-beam RRM and hybrid mobility model provide logically separable BM and MM as illustrated in FIGS. 3A, 3B and 3C. These embodiments provide a common multi-beam RRM model for all scenarios of hybrid MM given a specific UE referred to as UE1. With reference to FIG. 3A. L1 filtering 325, 326 may still be implementation specific and may be used mainly for beam-specific L1 RRM or for real-time BM. For a given UE and its serving/candidate TRP(s), the model delivers reliable TRP (L2) or cell (L2/L3) level quality metrics by measuring aligned (synchronized & selected) Tx-Rx beam pairs, but not beam pairs that are aligned/trained/refined during the BM process. L2 modules for (BM and) MM may be logically separated, merged together, or merged into L3, in response to different setups. The embodiment shown in FIG. 3C further emphasizes this distinction because each beam (pair) is filtered separately in block 372.

The common multi-beam RRM and hybrid MM model can be configured or adapt automatically to different mobility scenarios. Because the L1 BM is separate, the RRM/MM model can selectively disable L2 processing or L3 processing to reconfigure the system to perform only L2 processing, L2+L3 processing, or only L3 processing. For certain scenarios, the model may adopt only L2 filtering and reporting to implement RRM for intra-cell inter-TPR MM. This MM uses multiple beam pairs with one or multiple candidate TRPs in a single cell.

The model may use the same (DL or UL) RSs used by L1/L2 BM or may use different RSs, such as those defined by RAN 1. The examples 300, 350, and/or 370 of the framework may use only the aligned Tx/Rx beam pairs as input to the L2 processing, based on the implemented BM. For a different scenario, the example framework may adopt only L3 filtering and reporting (i.e., L2 filtering for MM may be disabled). L2 processing may be disabled, for example, when the beam pairs of a cell are not distinguishable by TRPs in the same cell (hence L2 operations may be limited to intra cell BM only) or when a "cell" has only one TRP and, thus, only inter-cell or inter-gNB mobility with or without RRC involvement. Of course, as illustrated in FIGS. 3A, 3B and 3C, both L2 and L3 filtering and reporting can be turned on at the same time depending on the RRM configuration.

In some embodiments, multi-beam operations by weighted combination or comparison criteria may result in dimension deduction from BM to MM, from L2 MM to L3 MM, or integration of hybrid metrics. The inter-module interfaces, identified with capital letters, A, B, C, D, E, and F in FIG. 3A may have decreasing dimensions of metrics, such as of the number of beams (pairs), or the number of metrics after certain combinations made by the processing. Depending on localization of logic modules into physical nodes of the network architecture, the interfaces may be internal (to a device or network node), over the air, or inside the network.

Depending on RAN architecture, for example when there is one TRP per cell, example embodiments can reduce to single beam operation, single frequency (omnidirectional LF only), and concrete BM/MM criteria (e.g., select and use only the best beam). The example embodiments can also integrate different inputs and hybrid metrics, such as channel, load, and throughput information, into the sequence of MM modules shown in the examples 300, 350 and 370 of the framework. UL and DL RRM metrics (or decisions) can be weighted and compared to one another or to certain thresholds to produce a unique result. The examples 300, 350 and 370 of the framework can also have different reporting structures. The reports of L2/L3 metrics for MM can be beam specific or can be aggregated, for example, of per-beam RSRP/RSRQ or RSRP/RSRQ across multiple beam pairs within a TRP or cell. Typically the BM report of L1/L2 metrics such as CSI (as in LTE) and UCI contain metrics that are beam (pair) specific.

In an example embodiment of the MM/RRM, a hybrid RRM and mobility system-level architecture/framework 1000) in FIG. 10 provides logically separated BM and MM functions. Given a hybrid UL and DL RRM for example, in an end-to-end mobility system, a hybrid RRM module located on the network side (say, gNB 1010) combines UL signal measurements done by (different TRPs inside) the network and DL RS measurements reported from the UE to provide a unified inputs into the hybrid MM/RRM module in FIG. 3A (or 1010 here) for a mobility decision.

Framework 1000 distributes or integrates the logic entities of RRM functions to physical entities (nodes) inside the network. Logic entity of L1, L2, L3 filtering modules in the RRM model (FIG. 3A), and their location or existence can be different by embodiments. Framework 1000 includes an RRC entity plus multi-beam DL RRM (at L1-L3) at UE 1015 in communications with one or more TRPs 1020 in cells 1025 with logical antennas 1030.

Certain layers, modules, or UL or DL functions, may be turned off in this framework 1000 based on configuration and scenarios.

The criteria functions at UE 1015, TRP 1020, and/or network gNB 1010 can be any agreed legacy or proposed criteria function of the UL and DL metrics or decisions with inputs at different layers (L1, L2, L3, or both).

L1 xRS/xSS measurements by TRPs 1020 or UE 1015 may generate L1-L3 RRM results and report them to one central unit (e.g., a gNB 1010, or a CU/DU, or a source TRP), for example, directly over omnidirectional LF channel, or through directional HF links to TRPs first, or by any L2-L3 signaling including but not limited to MAC CE piggyback, some format of downlink control information (DCI) and uplink control information (UCI) over physical uplink control channel (PUCCH) or physical uplink shared channel (PUSCH)-like CH.

In the fourth embodiment, hybrid RRM/mobility may provide more advantages than traditional non-hybrid mobility or purely DL mobility/RRM. Given an LF+HF and DL+UL hybrid mobility scenario for example, due to the fact that HF radio link is fundamentally unreliable, and potentially more power consuming. For example, the traditional DL mobility at least in HF or in LF high-speed train is very power intensive to UE, and hence UE centric UL mobility is probably more advantageous than DL mobility. To address different scenarios where DL or UL mobility may each have its advantages, a real system can include hybrid deployment of both, and similar concepts can be extended to other hybrid systems including HF UDN and D2D under LF coverage, or HF throughput boosting to umbrella LF cell.

Due to beam-formed DL xRS/xSS from TRP's with TX interval roughly aligned to beam sweeping or scheduling interval, and given the possible removal of CRS in NR, NR DL RS for RRM could be much less often and possibly irregular than LTE CRS. Consequently RLF/RRM are less responsive to CH changes and hence DL mobility and measurement needs UL signal (and RRM/mobility) to compensate it. By hybrid design, UL signals can be used to compliment the possibly removed or less frequent DL CRS or its equivalent, or save power for DL measurements, and deliver more reliable unified results regardless of UL and DL's radio channel or traffic load asymmetry.

In an example implementation using interactive BM and MM at different layers (timescales) and/or at different frequencies, similar to the existing DC for HetNet mobility of LF+HF for 3GPP, DC is applicable to LF assisted HF for the example embodiments. For the examples 300, 350 and 370 of the framework, DC may be used with a LF macro-cell and a HF small cell (microcell, picocell or femtocell). This configuration may provide better control of coverage (using LF) plus faster multi-point data links (using HF).

Furthermore, in example implementations, LF (DL and UL signaling) assisted UL (HF) mobility RRM can be used to enable hybrid mobility of mixed DL (LF) and UL (HF) RRM. Different implementations of UL and DL combinations may involve DL and UL mobility switching, or simultaneous UL and DL mobility.

Moreover, in an example implementation, the hybrid RRM/mobility criteria can be used to combine signals, for example HF and LF can be combined either at L2 or L3 or at both L2 and L3 based on UL/DL RSs. These implementations may provide slow L3 control at LF to configure criteria rules for beam-formed HF L3/L2/L1 link formation (BM) and may provide UE centric cell formation (mobility). Consequently, these implementations allow inter-cell DL and UL MM (e.g., cross cell/gNB/eNB HO) and the use of multi-beam RRM criteria with or without RRC signaling. These implementations may exhibit fast L2 and/or L1 control and data at either HF or LF or both to flexibly set up message flow in UL and DL RRMs. Thus, these embodiments integrate the real time BM harmoniously with CSI/UCI/UL beacon signaling, synchronization, and link adaptation with the slower time scaled intra-cell TRP selection, intra-cell MM RRM/RLM or inter-cell MM and RRM/RLM. These embodiments allow a UE-centric design or "virtual cell" formation with power-saving RRM (e.g., without CRS) for UL mobility, which can evolve into the hybrid UL-DL RRM/RLM and mobility mechanism.

Figure 11A:
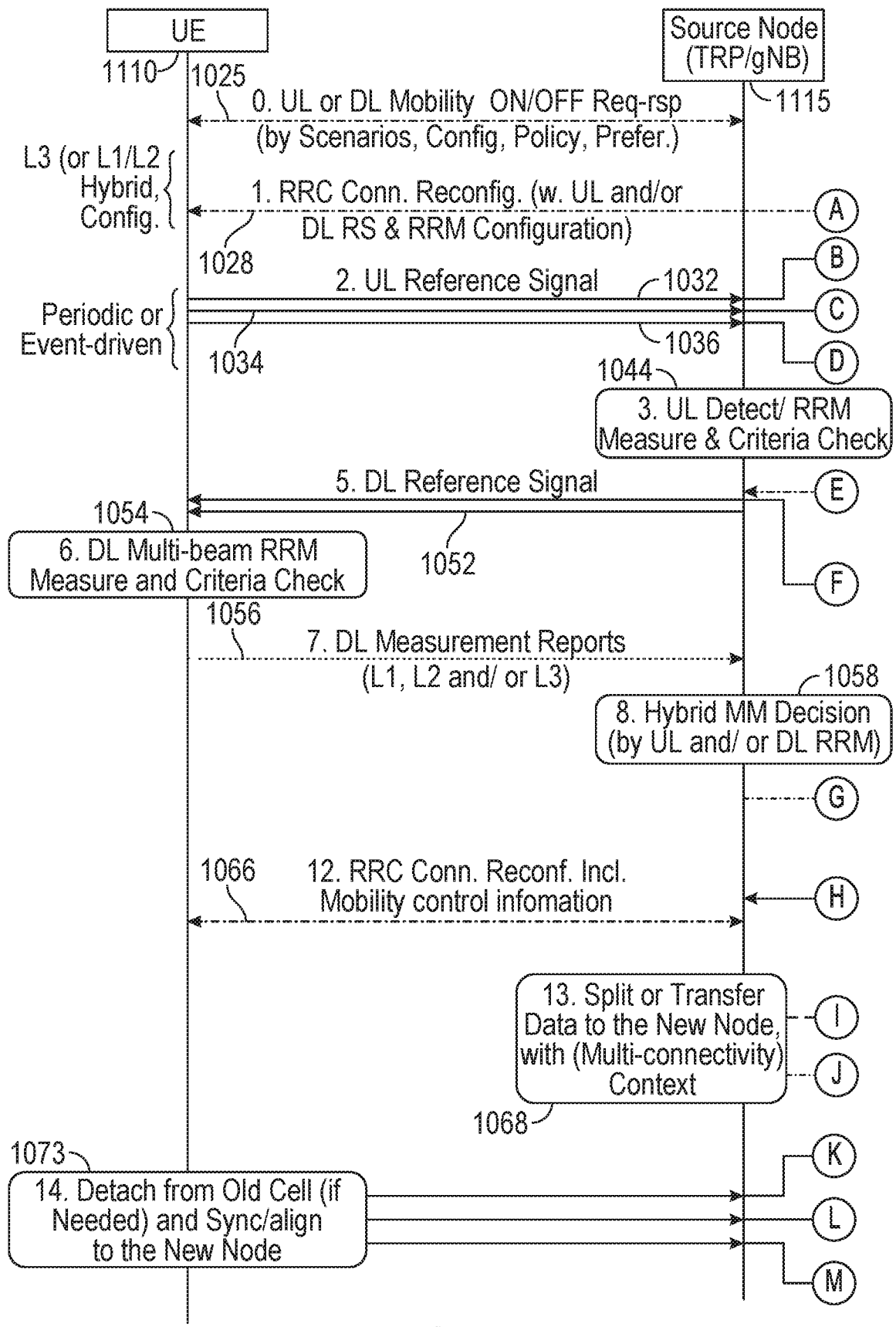
FIGS. 11A and 11B are a proposed timing diagram illustrating control flow of hybrid UL/DL mobility framework using the proposed hybrid multi-beam RRM model according to an example embodiment.
Figure 11B:
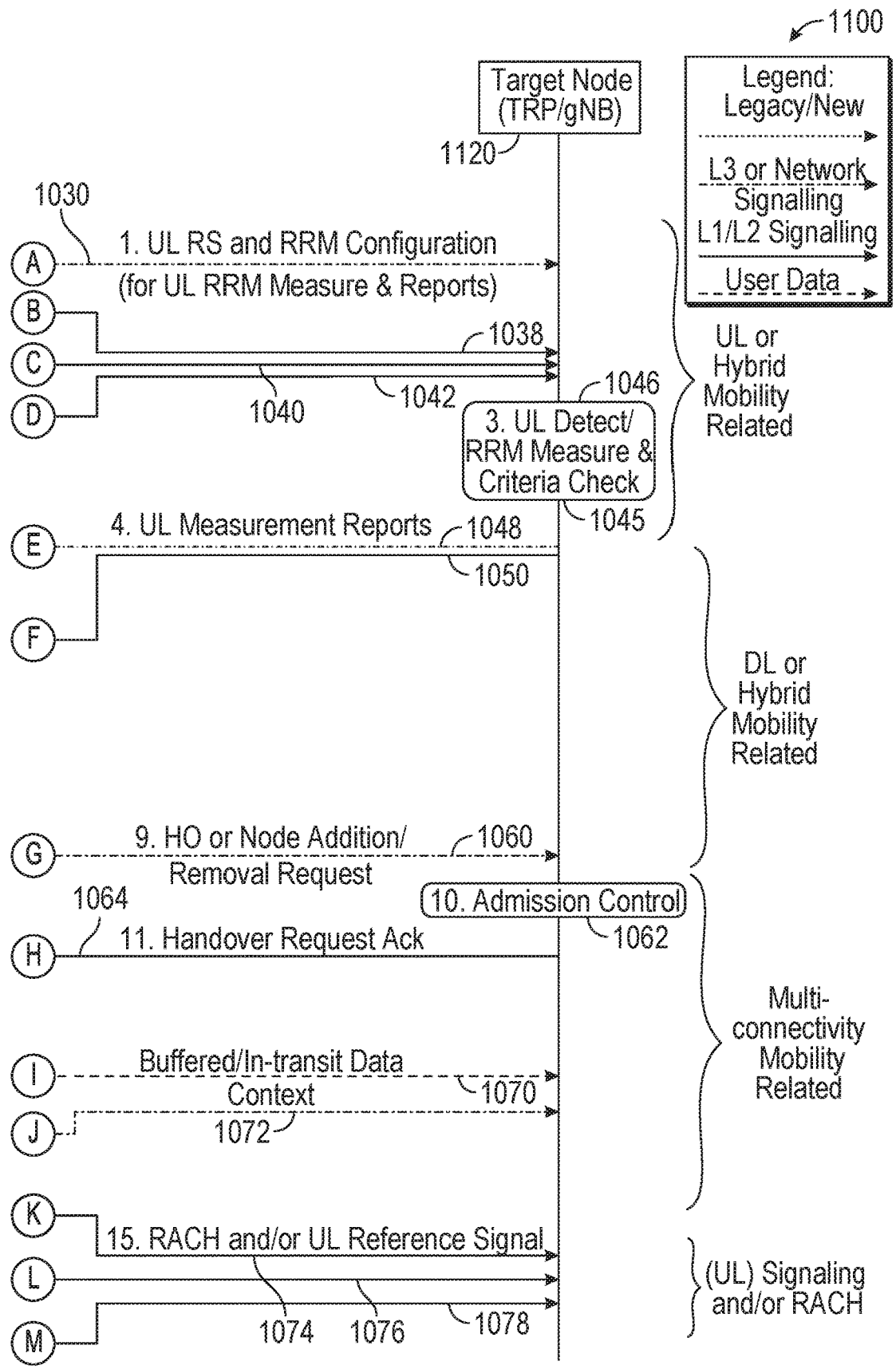

FIGS. 11A and 11B show an example communication activity timing diagram at 1100. The control flow for the system described by this timing diagram may, for example, use hybrid UL/DL mobility. The illustrated communications are between a UE 1110, source node (e.g. a TRP/gNB) 1115, and target node (e.g. a TRP/gNB) 1120. The RRM blocks in FIG. 3A or correspondingly in FIG. 11A 1044 and FIG. 11B 1046; the report generator (the FIG. 3A/3B/3C's report module) correspond to items 1054 and 1056 in FIG. 11A and to item 1048 in FIG. 11B. The hybrid mobility decision units are scattered on the network side—they are different from the RRM referred to at item 1058 of FIG. 11A (hybrid MM decision maker) or item 1062 of FIG. 11B (admission control) on the network side, which considers RRM's (DL measurement feedback) reports or local (UL) measurements for the hybrid decision making at L2, L3, or both. The hybrid mobility decision units consider UL, DL, or both to make a decision according to the L2 and/or L3 measurements, given the signaling support (e.g., message exchange between TRPs/gNBs, or between UE and the network in FIGS. 11A and 11B).

Control flow 1100 represents only one example embodiment. As shown, other example embodiments may use UL or DL mobility on/off request-response messages between UE 1110 and source node 1115 as shown at a step 0 (item 1025). The on/off request response messages may be triggered, for example, by or may carry scenario parameters, network configuration parameters, network policies, and/or user preference information. In different embodiments, Step 0 1025 can be, a default configuration, predefined configuration, a broadcast (e.g., SIB/MIB), dedicated one-way signaling, or a request-response (REQ-RSP) exchange, etc.

Step 1 at 1028 is an RRC Connection Reconfiguration Message from the Source Node 1115 to UE 1110, and carrying UL and/or DL RS and RRM configuration information to UE 1110. In different embodiments, step 1 can be alternatively be done more in real-time using L1 or L2 signaling instead of using a L3 (RRC) message. Step 1 at 1030 (shown in FIG. 11B) is from the source node 1115 to target node 1120, involving UL RS and RRM configuration message and carrying UL RRM measurements and report configuration information from source node 1115 to target node 1120.

Step 2 involves UL reference signals shown at 1032, 1034, 1036, 1038, 1040, and 1042 between UE 1110, source node 1115, and target node 1120, where the three separate lines represent only an example embodiment transmitting multiple number of UL RSs, the number of RSs may be less or more than three. In step 3, at 1044 and 1045, UL RS detection, RRM measurement, and criteria check are performed, with UL measurement reports provided in step 4 at 1048 from target node 1120 to source node 1115.

In different embodiments, steps 2-4 and anything related to UL RS measurements may not exist if UL mobility is turned off.

In step 5 at 1050 and 1052 a DL reference signal is provided by source node 1115 and target node 1120 to UE1 110. The UE 1110, in step 6 at 1054 performs a DL multi-beam RRM measurement, and checks the mobility management criteria and, in step 7 at 1056 reports the results to source node 1115. In different embodiments, the reports may be implemented using L1, L2, and/or L3 signaling messages. At step 8 at 1058 a hybrid MM decision is made by the source node 1115 based on UL and/or DL RRM results. At step 9 at 1060, a handover or node addition/removal request may be made from the source node 1115 to the target node 1120.

In step 10 at 1062 the target node 1120 performs admission control processing and, if admission (e.g., of addition or handover) is granted in response to the request at Step 9 1060, a handover or request acknowledgement is sent by the target node 1120 at step 11 at 1064. This may be followed by step 12 at 1066 with an RRC Connection Reconfiguration Message between the UE 1110 and source node 1115 including mobility control information. In step 13 at 1068, the data path may be split or transferred from the source node 1115 to the target node 1120 added as a result of the handover with or without multi-connectivity and with associated context transfer. This is shown at 1070 with buffered/in-transit data and context 1072.

At step 14 at 1073, the UE 1110 may detach from the old cell (Source node 1115) and synchronize and align to the newly added new node (target node 1120) as shown at step 15 at 1074, 1076, and 1078 using RACH and/or UL reference signal communications from the UE 1110 through the source node 1115 to the target node 1120, where the three lines are only example embodiments of multiple number of RACH and/or UL RS signals, be it more or less than number three.

The ordering shown in FIGS. 11A and 11B is exemplary only. Steps 1-3 (UL parts) and steps 4-7 (DL parts) may be shuffled or reordered in time. Logical entities of L1/L2/L3 filters for RRM measurements may be located at physical network entities differently, e.g., (L1-L3 at UE plus L1/L2 at TRP plus L3 at gNB), or (L1-L3 at UE plus L1 at TRP plus L2/L3 at gNB), or (L1/L2/L3 all at UE, TRP and gNB), for example. The existence, exact location, and L1-L3 separation of those logical entities can be based on "cell" definition, concrete configuration, and deployment.

In different implementations of the example embodiment may use different RRM criteria that can be configured as described in the flows shown in FIGS. 11A and 11B. The source and target nodes may be different device types, e.g., TRP (e.g., remote radio head (RRH) with or without L1 baseband and L2 MAC), CU or DU or gNB, depending on concrete mobility scenarios (intra-cell inter-TRP, or inter-cell intra-gNB, or inter-gNB, etc.) and network architecture.

For the example embodiment there are different hybrid scenarios in example implementations. Similar logical, measurement, signaling, and configuration flows with possibly different embodiments (in process and configuration content) still work for hybrid UL/DL mobility, for purely DL or UL mobility, for systems having one or multiple TRPs per cell, or for systems having one or multiple cells per gNB, etc.

Further hybrid scenarios for implementation include hybrid LF and/or HF, single-carrier or multi-carrier or hybrid, or single band or multiple bands, single connectivity or multi-connectivity by DC or CA, L2 or L3 only or both L2 and L3 filtering entities at different network nodes, with or without clear separation of and at BM and MM, different formats of concrete L3 and/or L2 filtering functions, and different locations of L2 and L3 logical RRM entities at different physical network nodes, or any of their hybrid combinations, or any orthogonally defined L2/L3 signaling (e.g., by Dual Connectivity RRC signaling from LF anchor nodes, or by MAC-layer CE/UCI/DCI . . . , etc.), or any combinations of the above scenarios.

Combinations of the above include for example, the functions in RRM criteria to combine UL and DL results can be configured as intra- (over the same) freq. or inter-frequency (across LF and HF) for any direction, across directions (e.g., both UL and DL results with a candidate TRP have to be above certain thresholds), from same UE-TRP pair (for intra-cell mobility), or even across UE-TRP pairs for the same given UE (e.g., for inter-cell handover where each cell has different sets of TRPs in coverage).

The approaches to pool together DL RRM and UL RRM measurement results, say, by UE feedback report of DL measurements to the network side where UL RRM and hybrid combination of DL and UL results can be done, is also configurable. Different cases how or where the network-side may pool UL RRM measurements of the same UE UL signal by different TRPs, post-process them, and/or exchange them for a unified MM decision is configurable, say, by newly introduced interfaces or by Xn to the serving node, or by S2-like interfaces to a central node, or by any other public or proprietary interfaces.

RRM signal, L1-L3 Tx/Rx and measurement and filtering, or reporting frequency of channel metrics can be configurable by the network: e.g., L2 RRM for mobility may be merged with L2 RRM for BM, or merged into L3 RRM for MM for the example scenarios below: e.g., when DL (or UL) signal or measurement freq. is 0, the hybrid RRM becomes purely UL (or DL) RRM; e.g., when HF (or LF) signal or measurement freq. is 0, the hybrid RRM becomes purely LF (or HF) RRM; e.g., when using LF assisted HF, or UL assisted DL, or vice versa, or to have UE to decide specific RRM configure autonomously.

Figure 12:
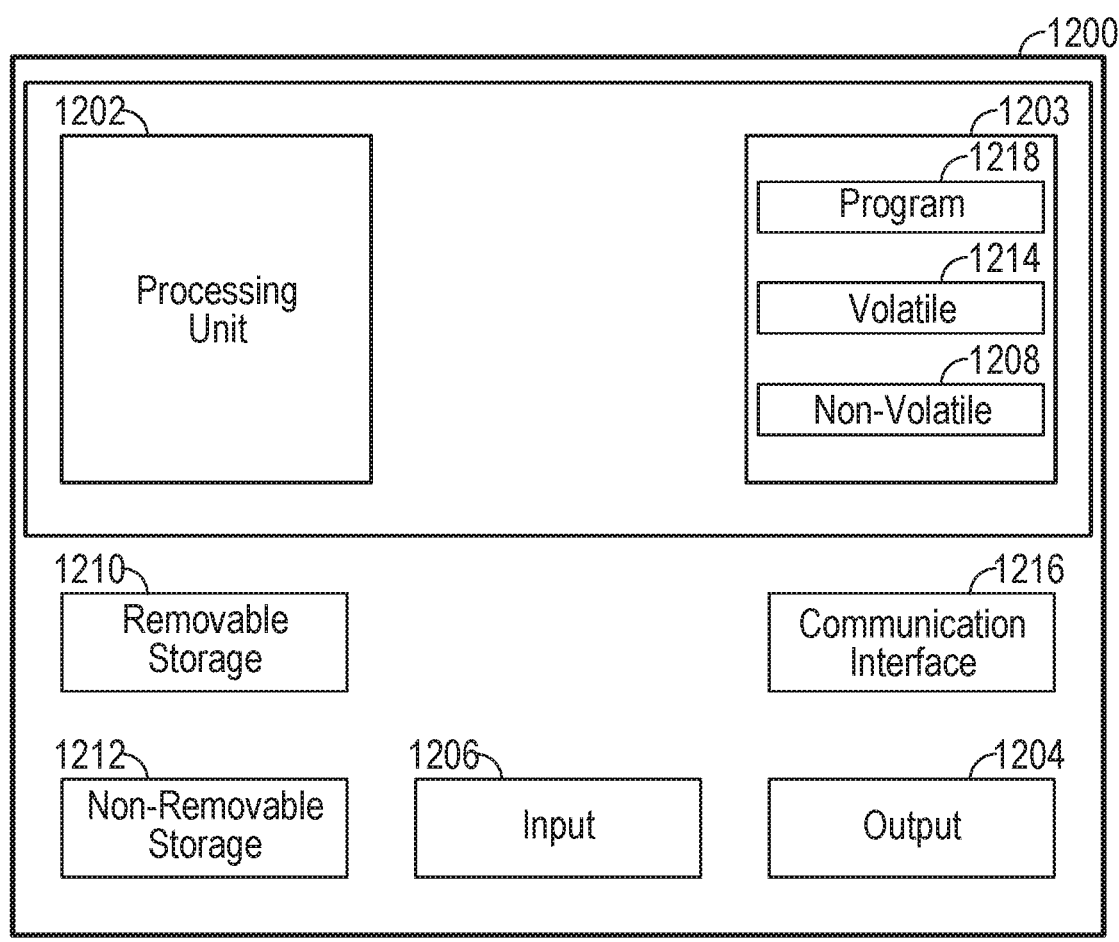
FIG. 12 is a block diagram illustrating circuitry of a user device or network node for implementing logically separated beam management and mobility management methods and algorithms for multi-beam communications via RF units according to example embodiments.

FIG. 12 is a block diagram illustrating circuitry for implementing one or more embodiments of devices to implement a framework that separates beam management from mobility management and performing methods according to example embodiments. All components need not be used in various embodiments. For example, UEs. TRPs, and gNBs may each use a different set of components.

One example computing device in the form of a computer 1200 may include a processing unit 1202, memory 1203, removable storage 1210, and non-removable storage 1212. Although the example computing device is illustrated and described as computer 1200, the computing device may be in different forms in different embodiments. For example, the computing device may instead be a smartphone, a tablet, smartwatch, a base station (eNB or gNB or CU or DU), a TRP, a Remote Radio Head (RRH), or other computing device including the same or similar elements as illustrated and described with regard to FIG. 12. Devices, such as smartphones, tablets, and smartwatches, are generally collectively referred to as mobile devices or user equipment.

Other devices such as base station (eNB or gNB or CU or DU), a TRP, a Remote Radio Head (RRH) are generally collectively referred to as TRPs, or network nodes, or network equipment. Further, although the various data storage elements are illustrated as part of the computer 1200, the storage may also or alternatively include cloud-based storage accessible via a network, such as the Internet or server based storage.

Memory 1203 may include volatile memory 1214 and non-volatile memory 1208. Computer 1200 may include— or have access to a computing environment that includes—a variety of computer-readable media, such as volatile memory 1214 and non-volatile memory 1208, removable storage 1210 and non-removable storage 1212. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1200 may include or have access to a computing environment that includes input 1206, output 1204, and a communication connection 1216. Output 1204 may include a display device, such as a touchscreen, that also may serve as an input device. The input 1206 may include one or more of a touchscreen, touchpad, mouse, keyboard, camera, one or more device-specific buttons, one or more sensors integrated within or coupled via wired or wireless data connections to the computer 1200, and other input devices. The computer may operate in a networked environment using a communication connection to connect to one or more remote computers, such as database servers or a base station. The remote computer may include a personal computer (PC), server, router, network PC, a base station, a peer device or other common network node, or the like. The communication interface and connection may include the interface with or connection by a Local Area Network (LAN), a Wide Area Network (WAN), cellular, Wi-Fi, Bluetooth, or other networks.

Computer-readable instructions stored on a computer-readable medium are executable by the processing unit 1202 of the computer 1200. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage such as a storage area network (SAN) indicated at 1220.

Claims or ideas can be similarly applied to other embodiments, such as non-5G/NR cellular wireless systems be it 4G systems with beamforming, or Wi-Fi systems, or any other combination of 4G+5G, 4G+Wi-Fi, etc., and similarly to other NR design issues, such as multi-beam RLM/RLF in NR.

EXAMPLES

A first example concerns user equipment (UE) including: a transceiver; a level one (L1) processing element coupled to the transceiver and configured to measure downlink (DL) reference signals from multiple beams received via the transceiver to generate L1 data describing the multiple beams; a level two (L2) processing element configured to consolidate, select, or filter the multiple beams responsive to the L1 data to produce L2 data corresponding to one or more of the multiple beams in a first cell that are consistent with preconfigured parameters; a level three (L3) processing element coupled to the L1 and L2 processing elements and configured to generate L3 data corresponding to one or more of the multiple beams in each of the first cell and a second cell; and a report generator coupled to the L1, L2 and L3 processing elements and configured to generate a report for a mobility event.

In a second example, the mobility event includes switching the UE from a first beam of a transmit and receive point (TRP) to a second beam of the TRP, wherein the first and second beams are beams of the multiple beams; the UE is configured to disable the L2 and L3 processing elements; and the report generator is configured to generate the report based on the L data.

In a third example, the mobility event includes switching the UE from a first beam associated with one transmit and receive point (TRP) in the first cell to a second beam associated with another TRP in the first cell, wherein the first and second beams are beams of the multiple beams; the UE is configured to disable the L3 processing element; and the report generator is configured to generate the report based on the L1 and L2 data.

In a fourth example, the first and second cells are associated with a single next generation Node B (gNB) and the mobility event includes handing off the UE from a first beam associated with a transmit and receive point (TRP) of the first cell to a second beam associated with the second cell associated with the gNB, wherein the first and second beams are beams of the multiple beams; and the report generator is configured to generate the report based on the L2 and L3 data.

In a fifth example, the first and second cells are associated with respective first and second next generation Node Bs (gNBs); the mobility event includes handing off the UE from a first beam associated with a first transmit and receive point (TRP) of the first cell to a second beam associated with a second TRP of the second cell, wherein the first and second beams are beams of the multiple beams; the UE is configured to disable the L2 processing element; and the report generator is configured to generate the report using the L1 and L3 data.

In a sixth example, the mobility event includes switching from a first pair of transmit (Tx) and receive (Rx) beams of the multiple beams to a second pair of Tx and Rx beams of multiple beams and the L1 processing element is configured to generate the L1 data describing aligned beam pairs.

In a seventh example, the mobility event includes switching from a first multi-frequency beam to a second multi-frequency beam of the multiple beams and the L2 processing element is configured to select and combine beams of the multiple beams for use in the second multi-frequency beam based on the L1 data.

In an eighth example, the DL reference signals include at least one xRS or xSS reference signal.

In a ninth example, the L2 processing element is configured to consolidate, select, or filter the multiple beams by applying at least one of a logical AND operator, a logical OR operator, a maximum operator, a maximum N operator, and averaging operator, a threshold comparison operator, or a relative comparison operator to the L1 data.

A tenth example concerns a transmission receive point (TRP) including: a transceiver; a level one (L1) processing element coupled to the transceiver and configured to measure uplink (UL) reference signals from multiple beams received via the transceiver to generate L1 data describing the multiple beams; a level two (L2) processing element configured to consolidate, select, or filter the multiple beams responsive to the L1 data to produce L2 data corresponding to one or more of the multiple beams in a first cell that are consistent with predetermined parameters; a level three (L3) processing element coupled to the L1 and L2 processing elements and configured to generate L3 data corresponding to one or more of the multiple beams in each of the first cell and a second cell; and a report generator coupled to the L1, L2 and L3 processing elements and configured to generate a report for a mobility event.

An eleventh example concerns the TRP wherein, the mobility event includes switching the TRP from a first beam of a user equipment (UE) to a second beam of the UE, wherein the first and second beams are beams of the multiple beams; the TRP is configured to disable the L2 and L3 processing elements; and the report generator is configured to generate the report based on the L1 data.

A twelfth example concerns the TRP wherein the mobility event includes switching from a first pair of transmit (Tx) and receive (Rx) beams of the multiple beams to a second pair of Tx and Rx beams of the multiple beams and the L1 processing element is configured to generate the L1 data describing aligned beam pairs.

A thirteenth example concerns the TRP wherein the mobility event includes switching from a first multi-frequency beam of the multiple beams to a second multi-frequency beam of the multiple beams and the L2 processing element is configured to select and combine beams of the multiple beams for use in the second multi-frequency beam based on the L1 data.

A fourteenth example concerns the TRP wherein the L2 processing element is configured to consolidate, select, or filter the multiple beams by applying at least one of a logical AND operator, a logical OR operator, a maximum operator, a maximum N operator, and averaging operator, a threshold comparison operator, or a relative comparison operator to the L1 data.

A fifteenth example concerns a mobility management method for a UE device including: processing downlink (DL) reference signals from multiple received to generate L1 data describing the multiple beams; consolidating, selecting, or filtering the multiple beams responsive to the L1 data to produce L2 data corresponding to one or more of the multiple beams in a first cell that are consistent with pre-configured parameters; processing data corresponding to beams in each of the first cell and a second cell to generate L3 data; and generating a report for a mobility event from the L1, L2 and L3 data.

In a sixteenth example, the mobility event includes switching the UE from a first beam of a transmit and receive point (TRP) to a second beam of the TRP, wherein the first and second beams are beams of the multiple beams; and the method further includes: disabling the L2 and L3 processing; and generating the report based on the L1 data.

In a seventeenth example, the mobility event includes switching the UE from a first beam associated with one transmit and receive point (TRP) in the first cell to a second beam associated with another TRP in the first cell, wherein the first and second beams are beams of the multiple beams; and the method further includes: disabling the L3 processing; and generating the report based on the L1 and L2 data.

In an eighteenth example, the first and second cells are associated with respective first and second next generation Node Bs (gNBs); the mobility event includes handing off the UE from a first beam associated with a first transmit and receive point (TRP) of the first cell to a second beam associated with a second TRP of the second cell, wherein the first and second beams are beams of the multiple beams; and the method further includes: disabling the L2 processing element; and generating the report using the L1 and L3 data.

In a nineteenth example, the mobility event includes switching from a first pair of transmit (Tx) and receive (Rx) beams of the multiple beams to a second pair of Tx and Rx beams of multiple beams and the method includes generate the L1 data describing aligned beam pairs.

In a twentieth example, the mobility event includes switching from a first multi-frequency beam to a second multi-frequency beam of the multiple beams and the method includes generating the L2 data by selecting and combining beams of the multiple beams for use in the second multi-frequency beam based on the L1 data.

In a twenty-first example, method includes at least one of consolidating, selecting, or filter the multiple beams by applying at least one of a logical AND operator, a logical OR operator, a maximum operator, a maximum N operator, and averaging operator, a threshold comparison operator, or a relative comparison operator to generate the L2 data from the L1 data.

In a twenty-second example, the RRM blocks and report generators provide DL measurement as inputs to hybrid mobility decision units in a source and target TRP, together with the locally (UL) measured RRM metrics. The decision units (admission control and the target, mobility decision maker at the source) consider UL, DL, or both to make a decision based on L2 or L3 or both measurements. The signaling, e.g., message exchanges between TRPs/gNBs or between UE and the network, enables the decision.

What is claimed is:

1. A user equipment (UE) comprising:
a transceiver;
a level 1(L1) processing element coupled to the transceiver and configured to measure downlink (DL) reference signals from multiple beams received via the transceiver to generate L1 data describing the multiple beams;
a mobility management processing element configured to process the L1 data to perform beam selection responsive to a first configured parameter having a first value or beam consolidation responsive to the first configured parameter having a value different than the first value, to identify a first set of one or more beams of the multiple beams associated with a first cell and a second set of one or more beams of the multiple beams associated with a second cell and to determine respective cell quality values at the UE for the first cell based on the first set of one or more beams and for the second cell based on the second set of one or more beams, and to apply level 3 (L3) processing, separate from the beam consolidation and beam selection and consistent with configured parameters, to the respective cell quality values;
a beam management processing element configured to operate in parallel with the mobility management processing element, the beam management processing element configured to determine, responsive to the L1 data, respective beam quality values for a plurality of selected beams of the multiple beams, each selected beam of the plurality of selected beams associated with a respective transmission reception point (TRP) of the first cell or with a base station of the first cell;
a first report generator coupled to the beam management processing element, the first report generator configured to generate a first report including N of the beam quality values for N respective beams of the plurality of selected beams, where N is an integer greater than one; and a second report generator coupled to the mobility management processing element, the second report generator configured to generate a second report on the cell quality value of at least one of the first cell or the second cell.

2. The UE of claim 1, wherein the DL reference signals include at least one of a channel state information reference signal (CSI-RS), synchronization signal block (SSB), demodulation reference signal (DMRS), primary synchronization signal (PSS), or secondary synchronization signal (SSS).

3. The UE of claim 1, wherein: the mobility management processing element is configured, by the first configured parameter, to perform the beam consolidation or beam selection by applying at least one of a logical AND operator, a logical OR operator, a maximum operator, a maximum N operator, an averaging operator, a threshold comparison operator, and a relative comparison operator to beams in the respective first and second sets of one or more beams in the L1 data.

4. The UE of claim 1, wherein the beam management processing element is configured to perform the beam consolidation or beam selection to provide the first and second sets of one or more beams according to configured level 2 (L2) filter parameters to determine the respective beam quality values for the plurality of selected beams of the multiple beams.

5. The UE of claim 1, wherein the beam management processing element is configured to filter the plurality of selected beams according to configured L3 parameters to determine the respective beam quality values for the plurality of selected beams.

6. The UE of claim 1, wherein:
the beam management processing element is configured to:
  filter the plurality of selected beams according to at least one of configured level 2 (L2) or L3 parameters to determine the respective beam quality values for the plurality of selected beams; and
  select N beams of the plurality of selected beams based on the determined respective beam quality values; and
the first report generator is configured to generate the first report on the beam quality values of the selected N beams.

7. The UE of claim 1, wherein the L1 data includes multiple beam quality values and the beam management processing element is configured to consolidate and select beams of the plurality of selected beams, responsive to the L1 data and to the first configured parameter, and to determine the respective beam quality values of the plurality of consolidated and selected beams.

8. The UE of claim 1, wherein the mobility management processing element is further configured to:
evaluate the first set of one or more beams, according to the configured parameters, to determine whether the first set of one or more beams is suitable as a set of one or more serving beams; or
evaluate the first set of or more beams and cause the UE to switch from the first set of one or more beams to the second set of one or more beams based on the configured parameters, the respective beam quality values of first beams in the first set of one or more beams, and the respective beam quality values of second beams in the second set of one or more beams.

9. The UE of claim 1, wherein:
the mobility management processing element is configured to apply level 2 (L2) processing to filter the L1 data for the multiple beams according to configured L2 parameters to perform the at least one the beam consolidation or the beam selection on the first set of one or more beams and the second set of one or more beams to determine respective cell quality values of the first and second cells; and
the second report generator is configured to generate the second report responsive to the determined cell quality values for at least one of the first cell or the second cell.

10. The UE of claim 9, wherein:
the mobility management processing element is configured apply the L3 processing to the respective cell quality values to:
  filter the respective cell quality values for at least one of first cell and the second cell according to configured L3 parameters;
  derive the respective cell quality values of the first cell and the second cell based on the filtered cell quality values; and
  evaluate the respective cell quality values to detect a mobility event; and
the second report generator is configured to generate the second report and an evaluation report corresponding to the first cell and the second cell.

11. The UE of claim 1, wherein the mobility management processing element is configured by a network to:
evaluate the respective cell quality values for at least one of the first and second cells to detect a mobility event; and
select at least one of the first cell or the second cell to serve the UE or cause the UE to switch between the first cell and the second cell, wherein the mobility management processing element is configured to select the at least one of the first cell or the second cell to serve the UE or cause the UE to switch between the first cell and the second cell responsive to at least one of the respective cell quality values for the first and second cells, the detected mobility event, the evaluated cell quality values, or the configured parameters.

12. The UE of claim 1, wherein:
the mobility management processing element is configured by a network apply level 2 (L2) processing to perform the at least one of the beam consolidation or the beam selection responsive to the L1 data to provide the first set of one or more beams and the second set of one or more beams according to configured L3 parameters to determine the respective cell quality values for the first and second cells; and
the second report generator is configured to generate the second report for at least one of the respective cell quality values for the at least one of the first and second cells.

13. The UE of claim 12, wherein:
the mobility management processing element is configured by the network to:
evaluate the second report to select one beam or multiple beams from among the first set of the one or more beams and from the second set of the one or more beams to produce an evaluation result; and
detect a mobility event corresponding to the selected one beam or multiple beams and at least one of the respective beam quality values, and the respective cell quality values of at least one of the first cell and of the second cell; and the second report generator is further configured to report at least one of the evaluation result or the detected mobility event.

14. The UE of claim 1, wherein:

the mobility management processing element is configured to:

select one beam or multiple beams from the first set of one or more beams and one beam or multiple beams from the second set of one or beams to serve the UE or to detect a mobility event; and control switching of the UE between the selected one beam or multiple beams of the first set of one or more beams and the selected one beam or multiple beams of the second set of one or more beams in response to the first report, the second report on the respective cell quality values, the detected mobility event, or the configured parameters.

15. A network device comprising:

a transceiver;

a level one (L1) processing element coupled to the transceiver and configured to measure uplink (UL) reference signals from multiple beams received from one or more UEs via the transceiver to generate an L1 report describing the multiple beams;

a mobility management processing element configured to determine, responsive to the L1 report, an L2 report corresponding to one or more of the multiple beams in a first cell that are consistent with configured parameters, the L2 report including a respective channel quality value for a first UE of the one or more UEs based on at least a first set of one or more beams of the multiple beams and for a second UE of the one or more UEs based on a second set of one or more beams of the multiple beams;

a beam management processing element configured to operate in parallel with the mobility management processing element, the beam management processing element configured to determine, responsive to the L1 report, respective beam quality values for the multiple beams of the L1 report; and at least one report generator coupled to at least one of the beam management processing element or the mobility management processing element, the at least one report generator configured to generate, based on the beam quality values or based on at least one of the UE channel quality values of the first and second sets of one or more beams of the multiple beams, at least one of a report on beam quality or a report on UE channel quality.

16. The network device of claim 15, wherein the mobility management processing element is configured to combine or consolidate and to select or filter the multiple beams to determine the respective channel quality values by applying at least one of a logical AND operator, a logical OR operator, a maximum operator, a maximum N operator, an averaging operator, a threshold comparison operator, or a relative comparison operator to the L1 report.

17. The network device of claim 15, wherein the beam management processing element is configured to filter the L1 report according to configured L2 filter parameters to determine the beam quality values for the multiple beams; and the at least one report generator is configured to generate the report on the beam quality of the multiple beams.

18. The network device of claim 15, wherein the beam management processing element is configured to filter the L1 report according to configured L3 parameters to determine the beam quality values for the multiple beams; and the at least one report generator is configured to generate the report on the beam quality of the multiple beams.

19. The network device of claim 15, wherein:

the beam management processing element is configured to:

filter the L1 report according to at least one of configured L2 or L3 parameters to determine the beam quality values for the multiple beams; and select one or more beams of the multiple beams based on the beam quality values; and the at least one report generator is configured to generate at least one of the report on the beam quality of the filtered L1 report or the report on the beam quality of the selected one or more beams.

20. The network device of claim 15, wherein:

the mobility management processing element is configured to filter the L1 report for the multiple beams according to configured L2 parameters to at least one of consolidate or select the L1 report to determine respective UE channel quality values for the one or more UEs; and the at least one report generator is configured to generate a report on UE channel quality for at least the one or more UEs.

21. The network device of claim 15, wherein the mobility management processing element is configured to:

evaluate the report on UE channel quality for at least one of the first set of beams and a third set of beams to detect a mobility event for the first UE; and select at least one of the first set of beams or the third set of beams to serve the first UE or cause the first UE to switch between the first set of beams and the third set of beams, wherein the processing element is configured to select or switch responsive to at least one of the generated report on UE channel quality, the detected mobility event, the evaluated reports, and the configured parameters.

22. The network device of claim 15 further comprising controlling the first UE to switch from the first set of beams to a third set of beams responsive to at least one of a report generated by the network device on the beam quality values for uplink beams in the first set of beams or a report generated by the first UE on downlink beam quality of the first set of beams or of cell quality of a cell including the first set of beams.

23. A mobility management method for a UE device comprising:

processing downlink (DL) reference signals from multiple beams to generate level 1 (L1) data describing the multiple beams;

processing the L1 data to perform beam selection responsive to a first configured parameter having a first value, or beam consolidation responsive to the first configured parameter having a value different from the first value to identify a first set of one or more beams of the multiple beams associated with a first cell and a second set of one or more beams of the multiple beams associated with a second cell to determine respective cell quality values at the UE device for the first cell based on the first set of one or more beams and for the second cell based on the second set of one or more beams;

applying level 3 (L3) processing, consistent with configured parameters, to the respective cell quality values, the L3 processing being separate from the beam consolidation and beam selection;

determining, responsive to the L1 data and in parallel with the determining of the respective cell quality values, respective beam quality values for a plurality of selected beams of the multiple beams, each selected beam associated with a respective transmission reception point (TRP) of the first cell or with a base station of the first cell; and generating a first report including N of the respective beam quality values for N respective beams of the plurality of selected beams, where N is an integer greater than one, and a second report on the cell quality value of at least one of the first cell or the second cell.

24. The mobility management method of claim 23 further comprising detecting a mobility event for the UE device, including determining that the second report meets configured mobility criteria for switching the UE device from a beam in the first set of one or more beams of the multiple beams to a beam in the second set of one or more beams of the multiple beams.

25. The mobility management method of claim 23, wherein performing the beam consolidation or beam selection includes applying at least one of a logical AND operator, a logical OR operator, a maximum operator, a maximum N operator, a weighted functional operator, an averaging operator, a threshold comparison operator, or a relative comparison operator to beams in the respective first and second sets of one or more beams of the multiple beams, in response to the first configured parameter, to derive the respective cell quality values for the first and second cells from the L1 data.

26. The mobility management method of claim 23, wherein the performing of the at least one of beam consolidation or beam selection includes filtering the L1 data for the multiple beams according to configured level 2 (L2) filter parameters to determine respective beam quality values for the first set of one or more beams and the second set of one or more beams.

27. The mobility management method of claim 23, wherein the determining of the respective beam quality values includes filtering the L1 data for the plurality of selected beams according to configured L3 parameters to determine the respective beam quality values for the plurality of selected beams.

28. The mobility management method of claim 23, wherein:

the determining of the respective beam quality values for the plurality of selected beams includes:

filtering the L1 data for the multiple beams according to at least one of configured level 2(L2) or L3 parameters to determine the respective beam quality values for the plurality of selected beams; and selecting one or more beams of the plurality of selected beams based on the respective beam quality values; and the generating of the first report includes generating the first report on the respective beam quality values of the filtered L1 data or on N beam quality values of the plurality of selected beams.

29. The mobility management method of claim 23, further comprising:

evaluating the second report responsive to a detected mobility event; and selecting at least one of the first cell or the second cell to serve the UE device or cause the UE device to switch between the first cell and the second cell, wherein the selection or switching is in response to at least one of the respective cell quality values, the detected mobility event, the evaluated second report, and the configured parameters.

* * * * *

UNITED STATES PATENT AND TRADEMARK OFFICE
CERTIFICATE OF CORRECTION

PATENT NO. : 10,951,285 B2  
APPLICATION NO. : 15/587309  
DATED : March 16, 2021  
INVENTOR(S) : Sang et al.

Page 1 of 1

It is certified that error appears in the above-identified patent and that said Letters Patent is hereby corrected as shown below:

On the Title Page

Item (57), in "Abstract", in Column 2, Line 14, delete "L2and" and insert --L2 and-- therefor In the Claims In Column 32, Line 48, in Claim 1, delete "cell" and insert --cell,-- therefor In Column 33, Line 46, in Claim 6, after "on", delete "the determined"

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*